US011260590B1

(12) United States Patent
Missout

(10) Patent No.: US 11,260,590 B1
(45) Date of Patent: Mar. 1, 2022

(54) FLOW CONTROL OF MOLTEN MATERIAL AND GAS EXTRACTION VIA ELECTROLYSIS

(71) Applicant: Kilncore Inc., Sutton (CA)

(72) Inventor: Antoine Missout, Sutton (CA)

(73) Assignee: KILNCORE INC., Sutton (CA)

( * ) Notice: Subject to any disclaimer, the term of this patent is extended or adjusted under 35 U.S.C. 154(b) by 0 days.

(21) Appl. No.: 17/334,961

(22) Filed: May 31, 2021

Related U.S. Application Data

(60) Provisional application No. 63/131,964, filed on Dec. 30, 2020.

(51) Int. Cl.
*B29C 64/209* (2017.01)
*B29C 64/393* (2017.01)
*B33Y 50/02* (2015.01)
*B33Y 30/00* (2015.01)
*B29C 64/118* (2017.01)

(52) U.S. Cl.
CPC .......... *B29C 64/209* (2017.08); *B29C 64/393* (2017.08); *B33Y 30/00* (2014.12); *B33Y 50/02* (2014.12); *B29C 64/118* (2017.08)

(58) Field of Classification Search
CPC ... B29C 64/209; B29C 64/393; B29C 64/118; B33Y 10/00; B33Y 30/00
See application file for complete search history.

(56) References Cited

U.S. PATENT DOCUMENTS

| 5,121,329 | A | 6/1992 | Crump |
| 7,891,964 | B2 | 2/2011 | Skubic et al. |
| 9,022,769 | B2 | 5/2015 | Swanson et al. |
| 9,919,510 | B2 | 3/2018 | Inamura et al. |
| 10,029,937 | B2 | 7/2018 | Van Pelt |
| 10,055,530 | B1* | 8/2018 | Sinivaara ............... B33Y 50/02 |
| 10,603,839 | B2 | 3/2020 | Lan |
| 2007/0089993 | A1* | 4/2007 | Schwartz ............... C25D 5/026 |
| | | | 205/133 |
| 2015/0307385 | A1 | 10/2015 | Klein et al. |

(Continued)

FOREIGN PATENT DOCUMENTS

| CN | 102529366 A | 7/2012 |
| CN | 104099675 A | 10/2014 |

(Continued)

*Primary Examiner* — Joseph S Del Sole
*Assistant Examiner* — Jamel M Nelson
(74) *Attorney, Agent, or Firm* — Benoit & Cote Inc.

(57) ABSTRACT

A fused deposition modeling printer comprises a reservoir for raw material, heating head assembly and a feeding conduit connecting the reservoir to the heating head. The heating head defines a sealed enclosure and comprises a conduit comprising a conduit surface for guiding a flow of material therein; an electrically conductive layer providing an electric resistance along the conduit surface for heating the material onto molten material; an electrolysis component located in the conduit distant from the conduit surface, comprising an electrolysis electrode; a nozzle through which exits the molten material from the heating head; an exhaust outlet for discharging gas resulting from the electrolysis out of the heating head; and a feeding conduit connecting the reservoir to the heating head. The fused deposition modeling printer is adapted to perform at the same time material deposition and electrolysis of the molten material.

20 Claims, 24 Drawing Sheets

(56) References Cited

U.S. PATENT DOCUMENTS

| | | | | |
|---|---|---|---|---|
| 2017/0282462 A1* | 10/2017 | Abe | ................... | B29C 64/188 |
| 2018/0010237 A1* | 1/2018 | Forseth | ................. | B33Y 30/00 |
| 2018/0036939 A1* | 2/2018 | Sundaresan | ............ | B33Y 70/00 |
| 2018/0178304 A1* | 6/2018 | Pucek | ................ | B23K 35/0205 |
| 2020/0298479 A1* | 9/2020 | Sweeney | ................ | B33Y 70/10 |

FOREIGN PATENT DOCUMENTS

| | | |
|---|---|---|
| CN | 105538715 A | 5/2016 |
| CN | 105984142 A | 10/2016 |
| CN | 206106378 U | 4/2017 |
| CN | 107225753 A | 10/2017 |
| CN | 108356270 A | 8/2018 |
| CN | 106313501 A | 9/2018 |
| CN | 110127992 A | 8/2019 |
| CN | 110421850 A | 11/2019 |
| WO | WO2018026909 A1 | 2/2018 |

* cited by examiner

FLOW CONTROL OF MOLTEN MATERIAL AND GAS EXTRACTION VIA ELECTROLYSIS

CROSS-REFERENCE TO RELATED APPLICATION

This application claims priority from U.S. provisional patent application 63/131,964, filed Dec. 30, 2020, the specification of which is hereby incorporated herein by reference in its entirety.

BACKGROUND

(a) Field

The subject matter disclosed generally relates to fused deposition modeling printers, aka 3D printers, and tools adapted to perform additive manufacturing processes through the deposition of additive materials. More particularly, the subject matter disclosed relates to heating components of additive manufacturing devices. The subject matter disclose relates to transformation and/or extraction of gas and material from raw material, e.g., regolith.

(b) Related Prior Art

Existing conventional fused deposition modeling printers are specialized pieces of equipment that are making their way into the mainstream market. It is currently possible to buy parts to build your own 3D machine, which requires time and knowledge. On the other hand, one can also buy an assembled 3D printing machine that is ready to use. In both cases, to build and assemble or repair the 3D printing machine, multiple mechanical parts have to be bought from multiple companies, which increases the cost, complexity, and time required for assembling a 3D printing machine while decreases the desire of owners of 3D printing machines to maintain spare parts to respond to wear and tear.

One supplier, www.RepRap.org, has tried to overcome these shortcomings by designing a general-purpose self-replicating 3D printing machine. However, since the RepRap fused deposition modeling printers is only capable of producing plastic-made parts, the opportunities provided by the RepRap machine are relatively limited.

Furthermore, fused deposition modeling printers are nowadays being actively developed by many other companies and individuals with the object of either trying to make an ever-cheaper fused deposition modeling printers or a more reliable plastic filament printer, which has a major drawback in the cost of the printing material: plastic beads for fused deposition modeling printers are expensive, at least about 30$/kg. Alternatively, others develop 3D metal printers with which people shine lasers at expensive metals. Another alternative is using resin as printing material, which, like plastic beads, is also expensive.

Accordingly, the present subject-matter aims to at least partly address these shortcomings.

More broadly, there are increasing needs for printing 3D objects made of high and very high melting temperature materials, and the present subject-matter aims to at least partially address these needs in an improved manner in comparison with existing tools.

Furthermore, the present subject-matter further aims to generate a synergetic relation between electrolysis and 3D printing, increasing both efficiency therethrough.

SUMMARY

According to an embodiment, there is provided a heating head assembly for a fused deposition modeling printer comprising a heating head and an electrolysis component. The heating head comprises a conduit comprising a conduit surface for guiding a flow of material therein; an electrically conductive layer providing an electric resistance along the conduit surface; and a plurality of head electrodes electrically connected to the electrically conductive surface of the conduit surface located in the conduit distant from the conduit surface. The electrolysis component is located in the conduit distant from the conduit surface and comprises an electrolysis electrode. A first voltage differential applied over the head electrodes drives an electric current to flow through the electrically conductive layer and heat the conduit surface. A second voltage differential applied over at least one of the head electrodes and the electrolysis electrode drives an electric current to travel through the material and produce electrolysis in the material.

According to an aspect, the head electrodes comprise at least three head electrodes.

According to an aspect, the electrolysis electrodes comprise at least two electrolysis electrodes.

According to an aspect, the electrolysis component comprises a first electrolysis component having a first electrolysis electrode associated therewith that penetrates in the conduit at a first depth; and a second electrolysis component having a second electrolysis electrode associated therewith that penetrates in the conduit at second depth different from the first depth. According to an aspect, the conduit has an axis, the first electrolysis electrode is mounted coaxial to the axis of the conduit and the second electrolysis electrode is mounted eccentric to the axis of the conduit.

According to an aspect, the first voltage differential is higher/lower than the second voltage differential.

According to an aspect, the second voltage differential is of alternative current.

According to an aspect, the heating head is monobloc.

According to an aspect, the heating head comprises a stack of electrically conductive pieces and of electrically insulating pieces, stacked alternatively. According to an aspect, at least one of the electrically conductive pieces and the electrically insulating pieces is made of ceramic.

According to an aspect, the heating head defined an enclosure in which material is heated into molten material, comprising: a material inlet for receiving material; a nozzle through which exits the molten material from the heating head; and an exhaust outlet for discharging gas.

According to an aspect, the heating head further comprises an exhaust tubing connected to the exhaust outlet, the exhaust tube comprises a heat break distant from the enclosure.

According to an embodiment, there is provided a fused deposition modeling printer comprising a reservoir for raw material; heating head assembly defining a sealed enclosure; and a feeding conduit connecting the reservoir to the heating head. The heating head assembly comprises a conduit comprising a conduit surface for guiding a flow of material therein; an electrically conductive layer providing an electric resistance along the conduit surface for heating the material onto molten material; an electrolysis component located in the conduit distant from the conduit surface, comprising an electrolysis electrode; a nozzle through which exits the molten material from the heating head; an exhaust outlet for discharging gas resulting from the electrolysis of the heating head.

According to an aspect, the fused deposition modeling printer further comprises a pressurized gas inlet connected to the feeding conduit.

According to an aspect, the fused deposition modeling printer further comprises a vibrating device connected to the feeding conduit.

According to an aspect, the fused deposition modeling printer further comprises an electric power source providing a first voltage differential to two electric contacts of the electric conductive layer and a second voltage differential to the electrolysis component relative to the electric conductive layer.

According to an aspect, the fused deposition modeling printer further comprises a type-S thermocouple penetrating at least partially in the enclosure.

According to an aspect, the heating head comprises a stack of electrically conductive pieces and of electrically insulating pieces, stacked alternatively.

According to an aspect, the heating head comprises a platinum-based funnel piece through which passes the conduit.

According to an aspect, the heating head comprises a cap sealing the enclosure, the cap having a transparent portion. The fused deposition modeling printer further comprises a camera pointing at the enclosure through the transparent portion.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
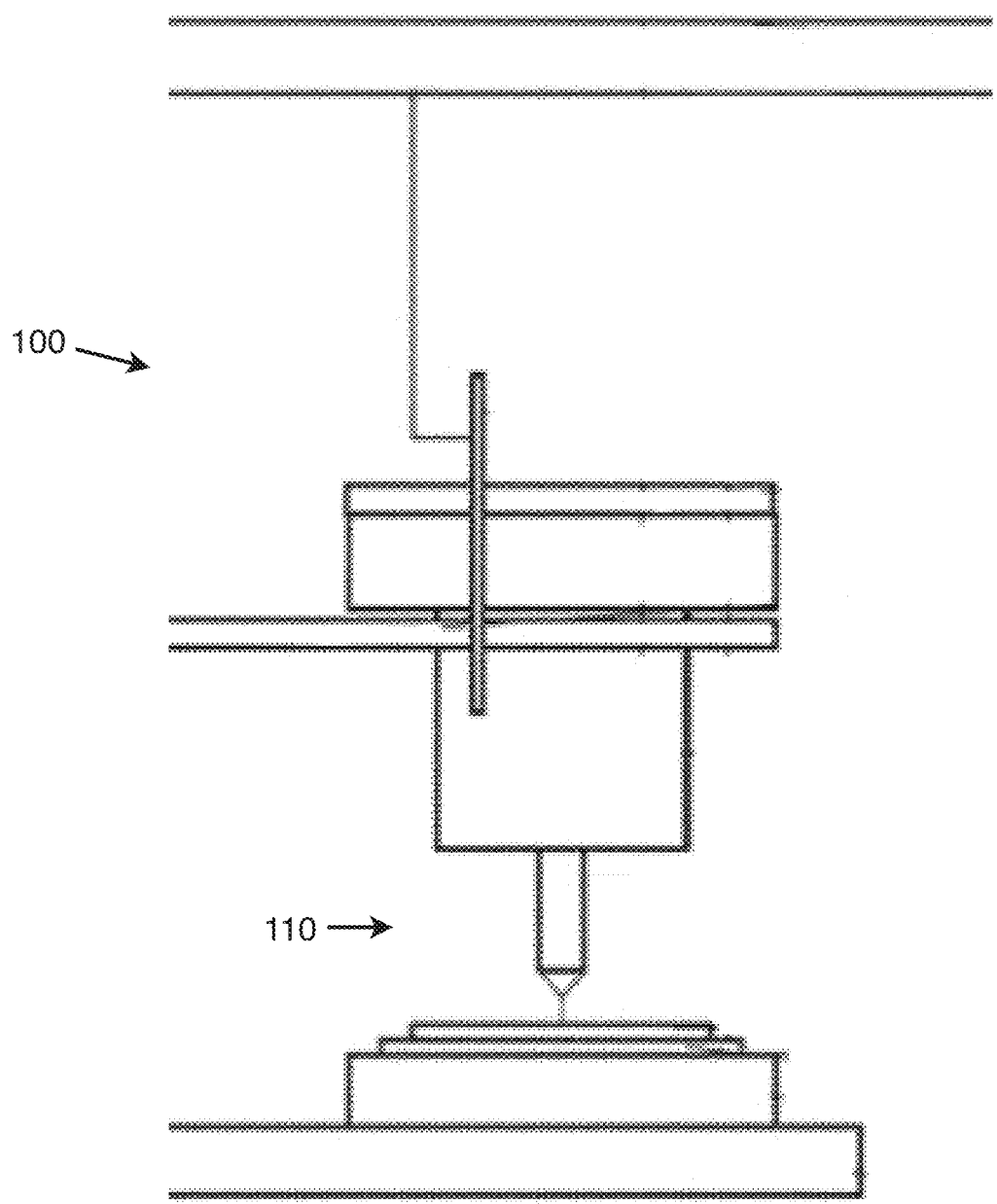
FIG. 1 is a schematic of a fused deposition modeling printer in accordance with an embodiment.

Nowadays, recycled glass is a widely available and low-cost material. So, in light of the text by John Klein from MIT: http://web.media.mit.edu/~neri/MATTER.MEDIA/Theses/John_Klein_MIT_MSc_Thesis_Submission%20(1).pdf, it becomes apparent that there is an opportunity to decrease the cost of operating a fused deposition modeling printers by both designing a fused deposition modeling printers capable of manufacturing their own replacement parts; and being able to use a variety of printing materials, including recycled glass material which is widely available at low costs.

Recycled glass is basically considered garbage these days; recycled glass is currently sold for instance as abrasive, pool filter material, or additive/ingredient for concrete products. Recycled glass can currently be bought in bulk, with a fixed granule size, for less than 0.50$/kg, and in some cases at even lower prices considering that some cities are spending money to get rid of their recycled glass rather than selling it.

Furthermore, with the explosion of fields in which are considered this type of manufacturing of particular parts, the needs in solution to print parts in a variety of materials, including very high temperature melting material increases.

Furthermore, with spatial exploration at our door, there is a need for manufacturing techniques adapted to the material available in this kind of environment as manufacturing techniques to produce different products including desired gas.

Accordingly, the fused deposition modeling printers, aka 3D printers or Additive Manufacturing Devices (AMDs), described herein takes advantage of the present situation by being able of using widely available recycled glass as a printing material as other high melting temperature material and even very high melting temperature materials. Nevertheless, alternative printing materials are considered with respect to the fused deposition modeling printers of the subject-matter, such as a variety of materials available in powder or granule formats. Using one such alternative printing material is intended to require simple adjustments to the fused deposition modeling printer described herein. Alternative printing material suitable for the present fused deposition modeling printers comprises sugar, PLA granules, ABS granules, PETG granules, metal, sand, Martian regolith, etc.

Further, the fused deposition modeling printers, aka 3D printers or Additive Manufacturing Devices (AMDs), described herein takes advantage of the chemical and electrolytic processes occurring when operating realizations of the present heating head.

With respect to the present description, references to "fused deposition modeling printer" should be understood to refer to a tool or device adapted to perform additive manufacturing processes through deposition of additive materials. Accordingly, the expression "fused deposition modeling printer" encompasses any device or subsystem of a tool adapted to perform such a process, regardless of the nature of the outcome of the process.

With respect to the present description, "electrolysis" should be understood to refer to a technique that uses either direct electric current (DC) or alternative electric current (AC) to drive an otherwise non-spontaneous chemical reaction from materials.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as," or the like) provided herein, is intended merely to better illuminate the exemplary realizations and does not pose a limitation on the scope of the realizations. No language in the specification should be construed as indicating any unclaimed element as essential to the practice of the realizations.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning in relation with normal installation of the product.

One found solution to reach high and very high temperatures consists in having a head or nozzle operating also as a crucible to both guide material to be deposited in and out of the fused deposition modeling printer 100 but also to heat the material to very high temperatures.

More particularly, the present solution takes advantage of the at least partially conducting nature of the heating head of realizations of the present description that both heat the material present in the heating head and operate as one or more electrode in an electrolytic process taking place in the heating head.

Referring to FIGS. 1, 2, 3, 5 and 6, a heating head 500 (see particularly FIGS. 1 and 5) can reach higher temperatures than most of those of the prior art. The heating head 500 comprises electrically conducting material that prevent the need to use, e.g., a heating coil mounted to the exterior surface of the prior art heating component to rise the temperature of the material travelling in the component. The heating head 500 of the present description otherwise may be adapted to known designs of fused deposition modeling printers 100.

Figure 2:
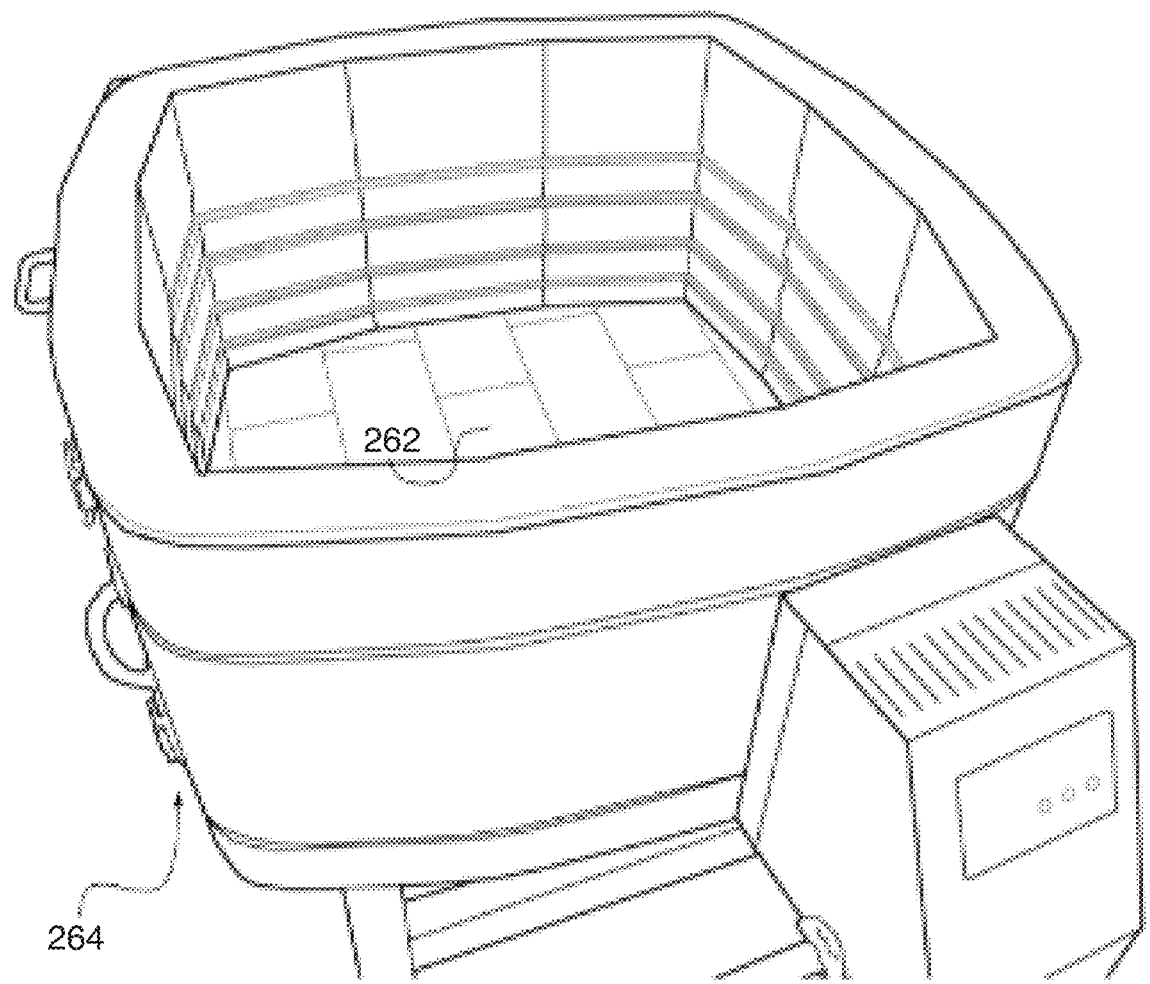
FIG. 2 is a perspective view of a heated chamber according to an embodiment used in relation to the fused deposition modeling printer according to an embodiment.

According to a realization, the fused deposition modeling printer 100 of the present description is operating in cooperation with, or comprises, a heated chamber 264 comprising a kiln assembly 262 as depicted on FIG. 2.

Figure 3:
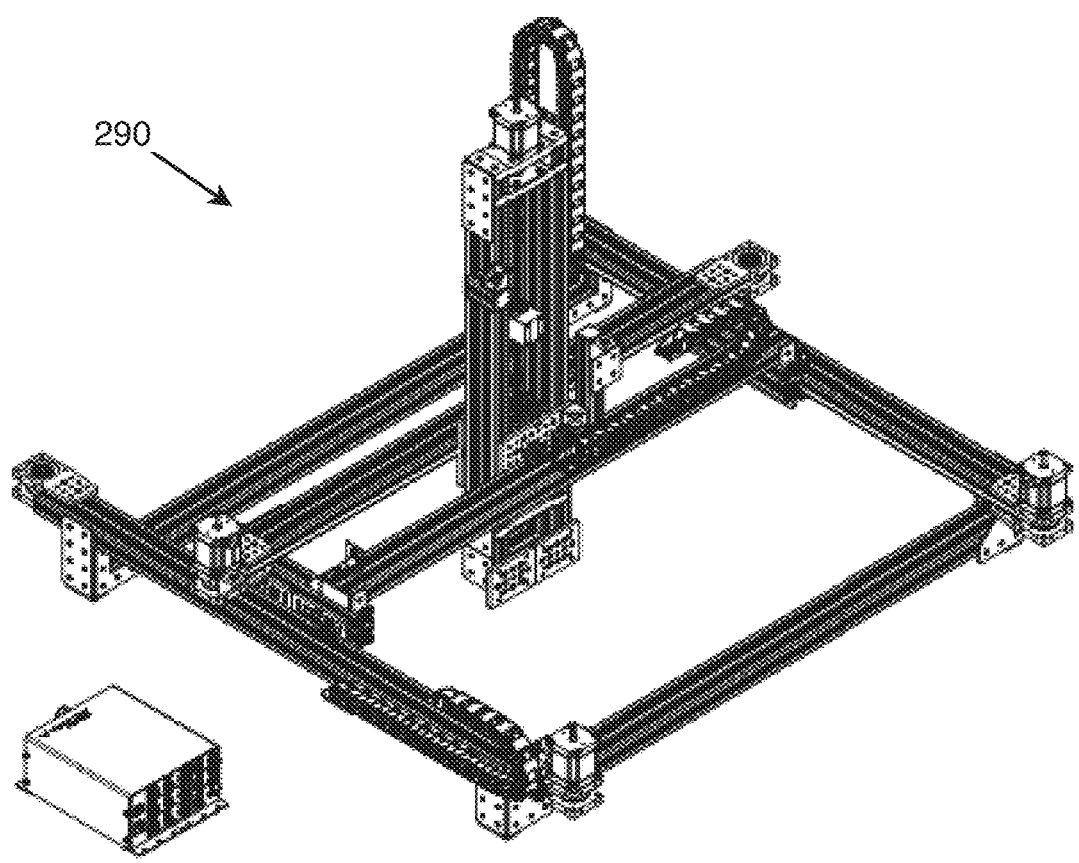
FIG. 3 is a perspective view of a Computer Numerical Control (CNC) machine part of the fused deposition modeling printer according to an embodiment.

Further, the fused deposition modeling printer 100 may operate using a Computer Numerical Control (CNC) machine 290 as depicted on FIG. 3 to continually guide the position of the head assembly 110 during the printing process.

Figure 4:
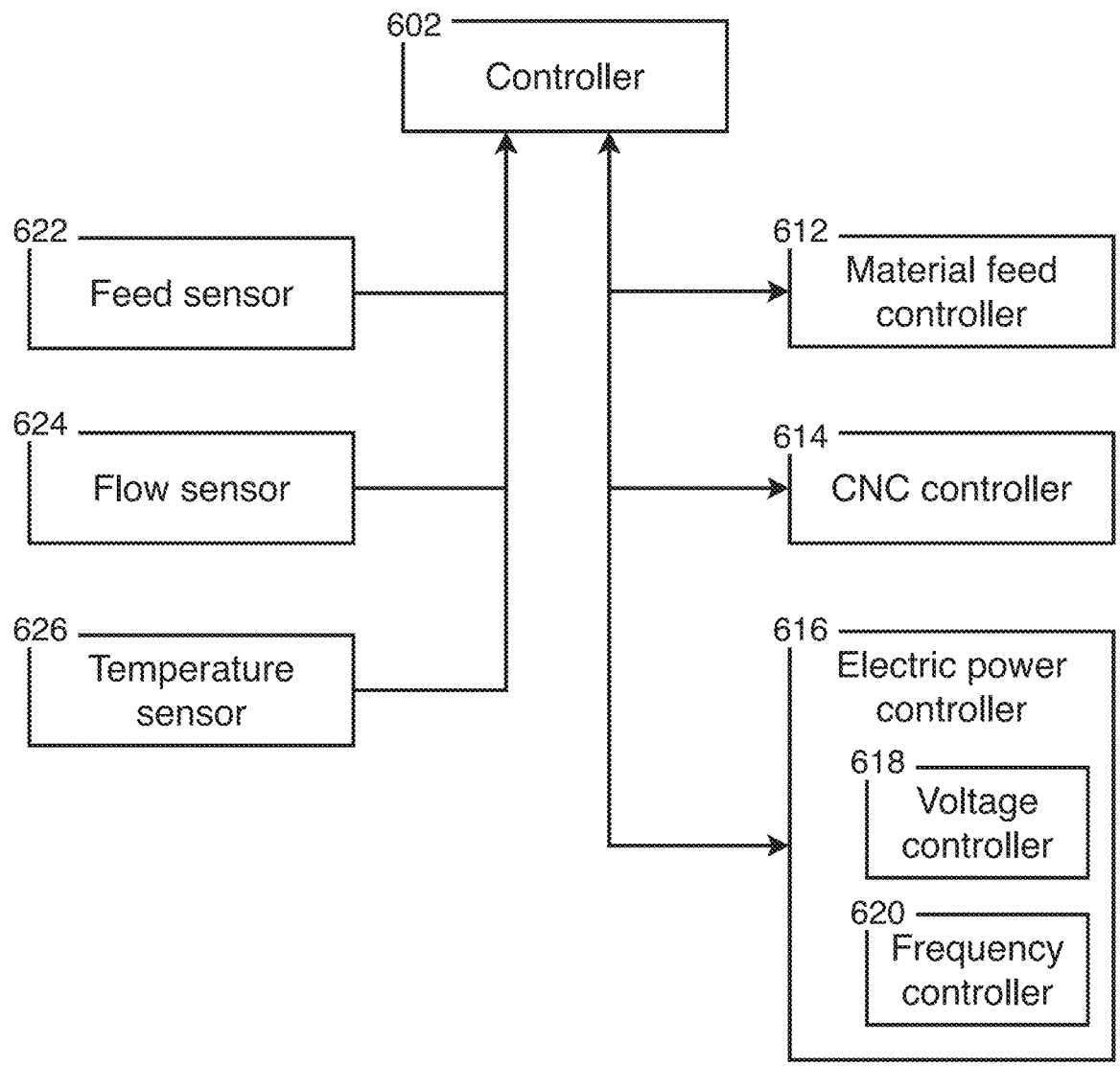
FIG. 4 is a schematic of components of an embodiment of a fused deposition modeling printer.

Referring to FIG. 4, the fused deposition modeling printer 100 operates under the control of a controller 602 connected to sensors (e.g., feed sensor 622, flow sensor 624, temperature sensor 626) and other operative components (e.g., material feeding controller 612, CNC controller 614 and electric power controller 616, aka electric power source, comprising a voltage controller 618 and optionally a frequency controller 620) to control all parameters of operation (e.g., temperature, the flow of material, and other controllable characteristics of the material such as pressure, controllable electrical parameters, controllable tool parameters, nozzle position, etc.) of the fused deposition modeling printer 100 during its operation.

Figure 8:
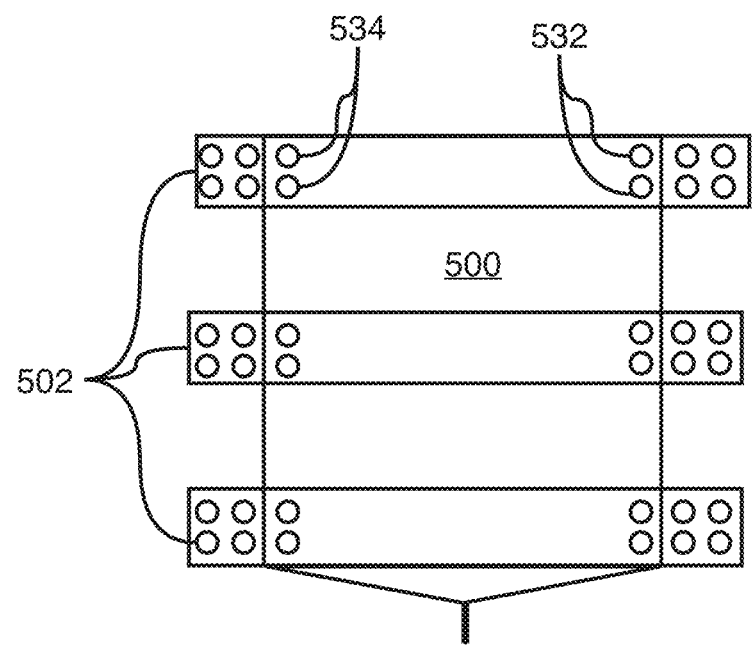
FIG. 8 is a schematic front view of a heating head assembly with a series of two-piece tightening rings mounted thereto in accordance with an embodiment.

Referring now particularly to the heating head 500 of FIGS. 5, 6, 11 and 12, the heating head 500 comprises a series of disk flanges 523, 524 and 525 extending outwardly from the conduit portion 528 of the heating head 500 and having preferably circumference surfaces 503, 504 and 505 operating as the electrical contacts, aka electrodes, for connection with tightening rings 501 or 502 (e.g., see FIG. 8).

According to realizations, the disk flanges 523, 524 and 525 are at least partially made of electric conductive material, or in other words the disk flanges 523, 524 and 525 may either be made of electrically conductive material, aka covering the entire thickness of the part, or alternatively comprises a layer of electrically conductive material about the surface or inside the disk flanges 523, 524 and 525.

Accordingly, electric circuit(s) are provided through the electrically conductive material, wherein current travelling in the electrical circuit(s) heats the material 510 in contact with a material guiding surface part of, or about, the electric circuit(s).

According to a realization a needle valve 506 of a suitable material is used, centered relative to the conduit 508, mounted from a support (not depicted) at its top, wherein the needle valve 506 provides aid for flow control by, for example, changing gas pressure and/or changing output temperature. The needle valve 506 is moveable up and down deeper in the melting or melted material 510. According to a realization, the needle valve 506 is cooled down at or about its support, above the level of the material 510.

Further, as depicted, electrolysis electrodes 507 are partially immersed in the conduit 508, and more precisely in a portion wherein the material 510 is at least partially molten in a molten material 509. Use of the electrodes 507, in some cases in the presence of a suitable flux, for example, of cryolite in the case of alumina, allows electrolysis of oxides potentially present in the raw material in the heating head 500, wherein electrolysis at this state generates oxygen 511.

Figure 11:
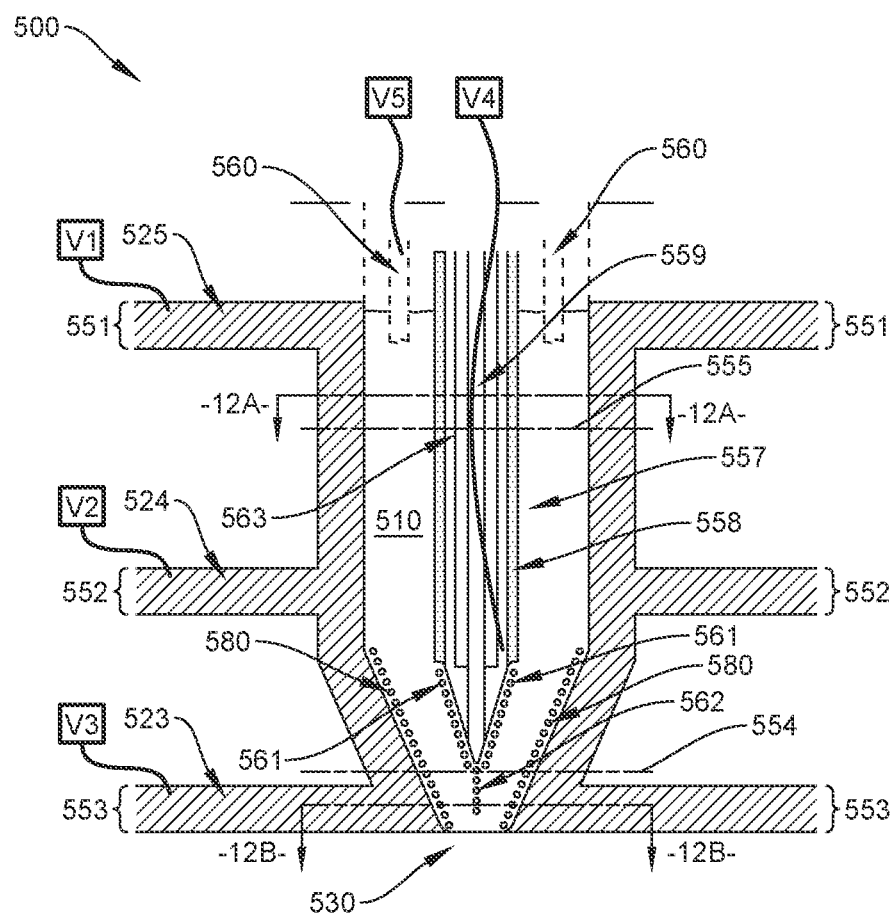
FIG. 11 is a partial cross-section side view of a heating head assembly in according with an embodiment.

It is to be noted that the electric circuit(s) are driven, aka controlled, by electric power sources. To depict control of the electric circuits, FIG. 11 depicts a first electric power source V1 connected to the top-side electrode 551, a second electric power source V2 connected to the middle-side electrode 552 and a third electric power source V3 connected to the bottom-side electrode 553. Electrodes 551, 552 and 553 are head electrodes since part of the heating head 500. Complementarily, as explained hereinafter, a fourth electric power source V4 is connected to the nozzle electrolysis electrode 557 while a fifth electric power source V5 is connected to the top electrolysis electrode(s) 560. Accordingly, as explained hereinafter, the electric power sources V1, V2 and V3 are connected to each other through the structure of the heating head 500 comprising the head electrodes 551, 552 and 553, while current travels to/from the electric power sources V4 and V5 are using electrolysis electrodes 560, and material 510 traveling in the heating head 500 wherein electrolysis process facilitate travel of current from/to another power source (V1/V2/V3).

Further, according to a preferred embodiment, the electric power sources V1, V2, V3, V4 and V5 are all electrically fed by the same electric controller, e.g., electric power controller 616 (from FIG. 4), wherein the electric power sources V1 to V5 depict voltage and/or polarization, and thus more generally power driven, aka generated or forced, over parts of the heating head 500 to generate the desired electric circuits.

Figure 12A:
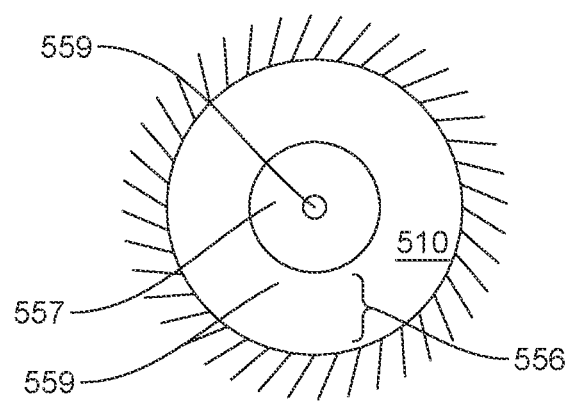
FIGS. 12A and 12B are partial cross-section top views of the heating head assembly depicted on FIG. 11 where the cross-section top views are according to cross-section lines A-A and B-B depicted on FIG. 11.
Figure 12B:
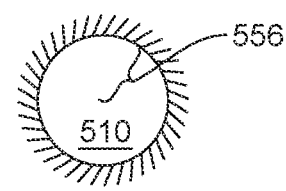

Referring back to the heating head 500, particularly of FIGS. 11 and 12A-B, the conduit portion 528 of the heating head 500 is also at least partially made of electrically conductive material, wherein the electric conductive material is both connected to at least one of the disk flanges 523, 524 and 525 and preferably covering at least part of the conduit surface 529 in contact with the travelling material and thus well adapted to melt the material traveling in the conduit portion 528 of the heating head 500.

According to requirements, and according to preferred realizations, the conduit surface 529 of the conduit portion 528 features electrically conductive material on its whole surface for optimal heating of the travelling material 510.

Referring particularly to FIGS. 7, 8 and 11 to 13, according to realizations the electric contacts (i.e., the tightening rings) are single piece tightening rings 501 (FIG. 7) or multi-piece, for example, two-piece tightening rings 502 (FIG. 8), wherein the extremity of the tightening rings 501, 502 are either attached to each other (for example tightening rings 501) or attached to one another (for example tightening rings 502) to form a closed ring or ring assembly contacting and inwardly pressing tightly the complete circumference surfaces 503, 504, 505 of the disk flanges 523, 524 for optimal electrical contact therebetween.

Figure 9:
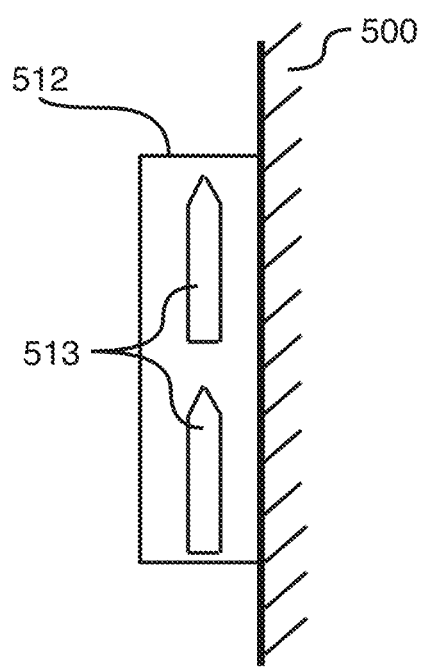
FIGS. 9 and 10 are cross-section views of portions of exemplary heating head assemblies in accordance with embodiments wherein a portion of a heating head and of a tightening ring are depicted.
Figure 10:
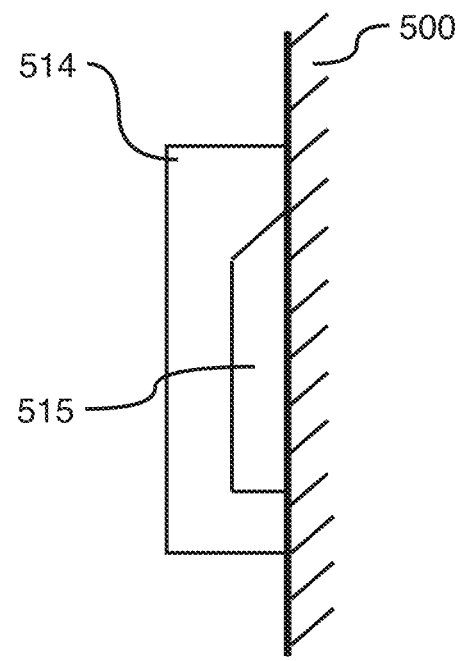

Referring additionally to FIGS. 9 and 10, according to realizations the tightening rings 501 or 502 are cooled down via a flow of cooling fluid. According to realizations, the tightening rings 501, 502 comprise either one or more recesses, for example, recess 515, limited by the combination of the structure 514 of the tightening ring 501, 502 or alternatively one or more conduits, for examples the two conduits 513, totally enclosed in the structure 512 of the tightening rings 501, 502 and isolated from the heating head 500. According to realizations, and particularly to the materials of the tightening rings 501, 502 and the temperature reached by the tightening rings 501, 502, the cooling fluid may be for instance air, water, oil, or another heat exchange fluid that may be circulated in the exemplary conduits 513 or recess 515.

When cooling fluid is used, the tightening rings 501, 502 features inlet(s) 532 and outlet(s) 534 connectable to a fluid exchanging source (not depicted).

It should further be noted that the tightening rings 501, 502 may further provide a combined function of support to the heating head 500 when connected to a support structure, wherein the tightening rings 501, 502 provides aid in alignment and/or displacement of the heating head 500.

It should further be noted that the design of the heating head 500 allows the use of multiple tightening rings 501, 502 operating as multiple electrical connectors, and thus control of how the current travels in the heating head 500 through control of the polarity and/or voltage over the tightening rings 501, 502 through the electric power source V1, V2 and V3 connected to the tightening rings.

Figure 5:
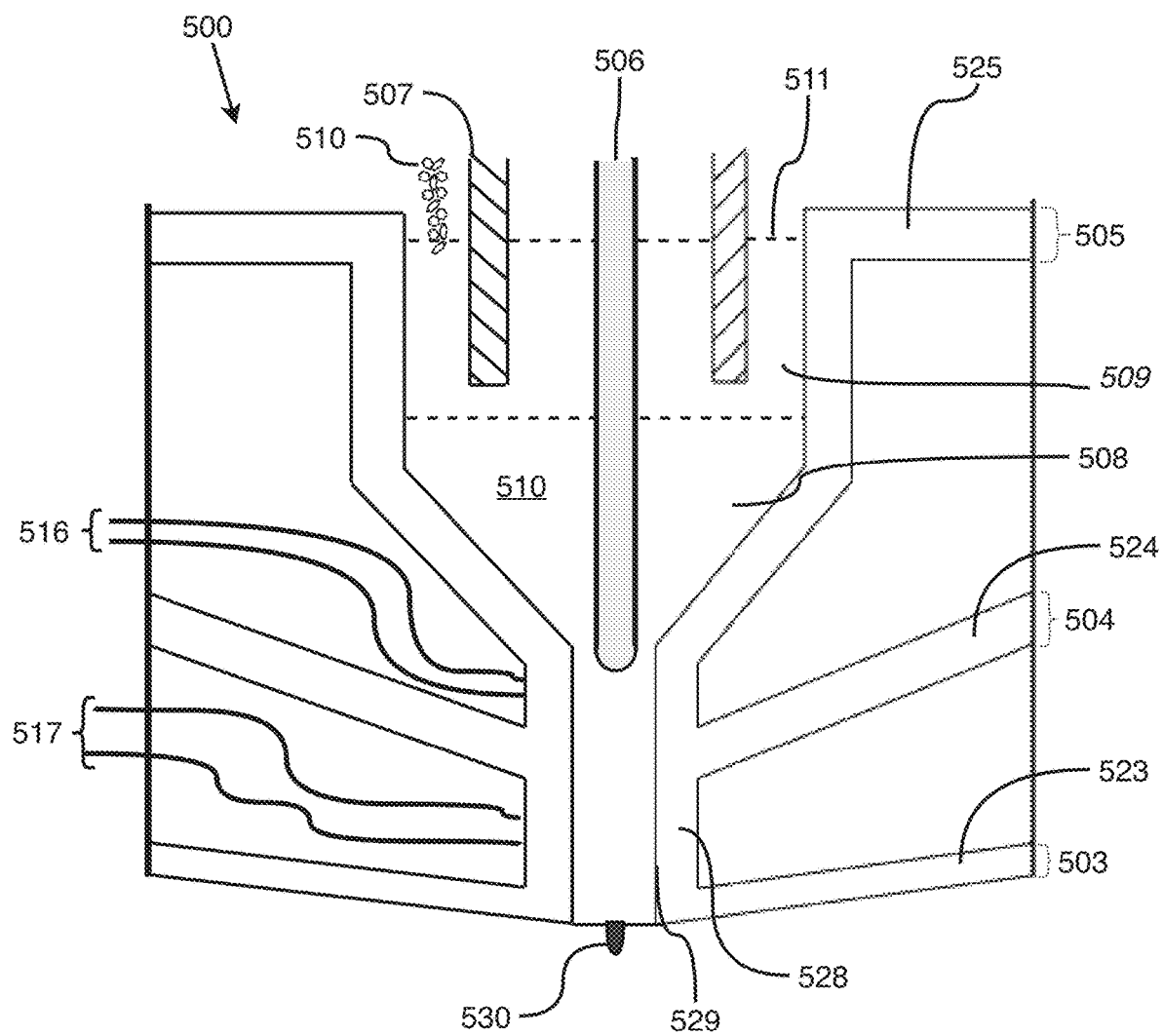
FIG. 5 is a schematic of a partial sectional side view of components of a heating head assembly of a fused depiction modeling printer in accordance with an embodiment.
Figure 6:
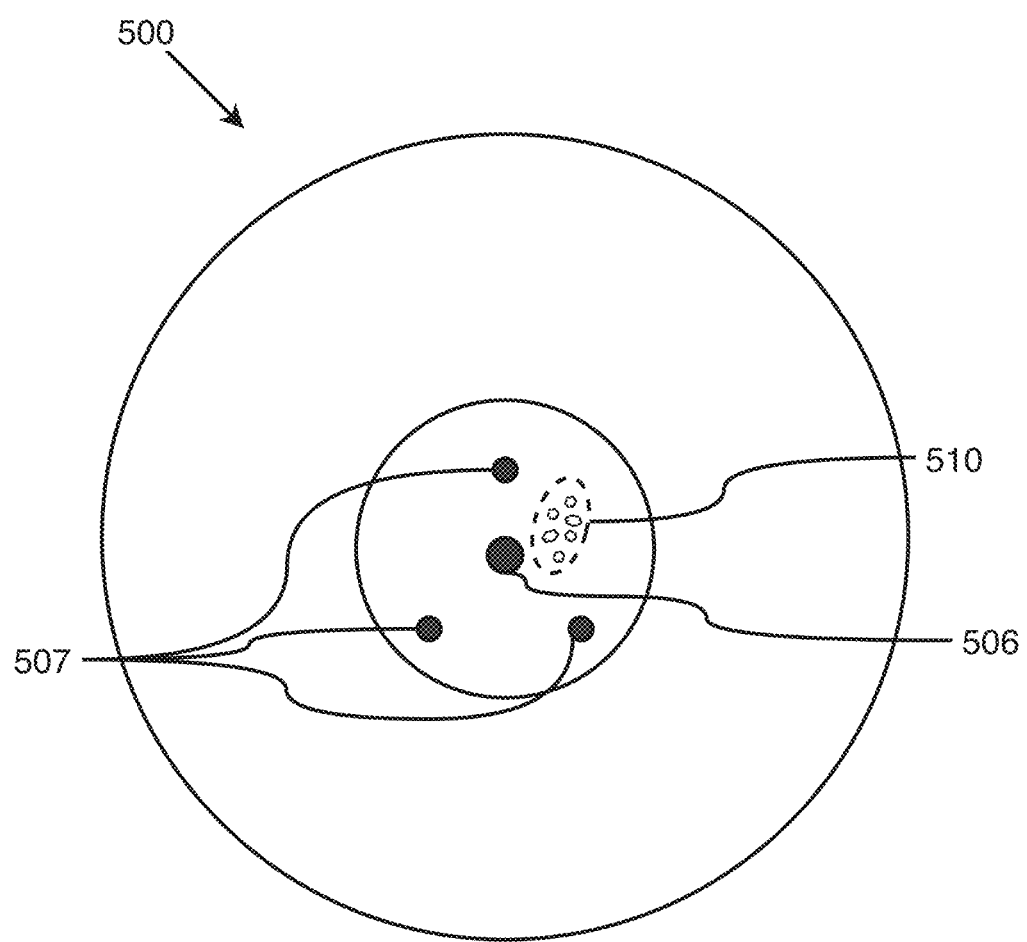
FIG. 6 is schematic top view of the heating head assembly depicted on FIG. 5.
Figure 7:
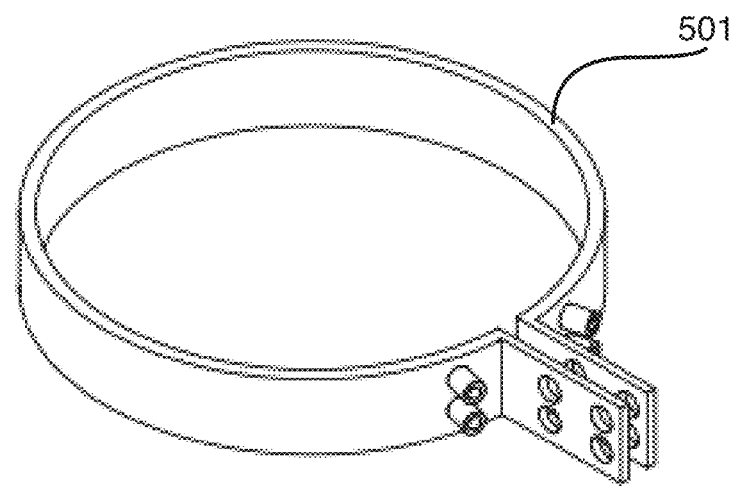
FIG. 7 is a perspective view of an exemplary tightening ring usable with the heating head assembly depicted on FIG. 5.

Referring particularly to FIG. 5, sensors 516 and 517, and more specifically resistive sensors 516 and 517 may be connected to the heating head 500 to measure the temperature of the heating head 500 and to adjust, in real-time or almost in real-time, the power transmitted to the tightening rings 501, 502 to monitor and control the operation of the heating head 500.

According to realizations, the heating heads 500 may have conduits of a) different length, b) different length ratios, or c) different distance ratio between the inner ends of the disk flanges 523, 524, 525 according to design to provide either a greater number of temperature-controlled sections, or more fine control over sections of the conduit surface 529. For example, in a realization, the temperature in each of the sections may be controlled by controlling the electric power transmitted to the tightening rings mounted to the disk flanges that are boundary to the temperature-controlled section, for example, disk flanges 524 and 525 for the top section of the conduit on FIG. 11.

Accordingly, sensors, for example, sensors 516 and 517, may be located at different locations along the conduit 508 to monitor and control finely each of the temperature-controlled sections of the heating head 500.

According to realizations, the heating head 500 may be free of material between the disk flanges 523, 524 and 525. According to alternative realizations, the heating head 500 may feature electrically insulating material between two neighbor disk flanges, for example filling the space therebetween or vertical radial membranes. When needed, the additional material may provide extra robustness to the heating head 500. Other reasons, including other structural reasons and fabrication reasons, are also contemplated therethrough.

Referring now particularly to FIGS. 11 and 12A-B, the heating head 500 of the present description additionally introduces a technique to selectively extract gas, e.g., oxygen, from material heated using the heating head 500 and discarding unwanted gases from the material as needed.

A voltage differential between the electrode 551 and the electrode 552 via the electrically conducting material is used to heat material 510 up to the desired temperature. Voltage differential between the electrode 552 and the electrode 553 also serves as heating the material 510 but also serves as a gradient for an electrochemical reaction about the top electrolysis electrode 580 and an electrochemical reaction about the center electrolysis electrode 561. A voltage differential between the electrode 562 and nozzle electrolysis electrode 557 and/or the electrode 553 and the electrode 557 (depending whether or not there is a voltage differential between the electrode 552 and the electrode 553) drives an electrochemical reaction near the nozzle 530. A voltage differential between the electrode 551 and the electrode 560 drives the electrochemical reaction near the nozzle 530.

Various methods are available to provide and control the proper voltage and currents levels. These methods are not listed in detail herein since some of these methods can be found in the state of the art of electrical engineering.

According to realizations, the electrode 557 can be made of platinum or any suitable allow or cermet or conducting material.

The voltage differentials between the electrode 551, the electrode 552, and the electrode 553, either with a voltage differential of direct current or alternating current, provides heat for melting the raw materials 510. However, a voltage differential between the electrode 552 and the electrode 553, while doing electrolysis with the electrode 560, drives the intensity of the electrochemical reaction, i.e., the electrochemical reaction being either stronger or weaker depending on the distance between the electrode 557 and either the electrode 552 or the electrode 553. Variable thickness of an optional electrode sheeting 558 (for example, made of alumina) can also localize where the desired reaction happens.

The voltage difference between the electrode 551 and the electrode 560 drives the generation of, e.g., oxygen, and metal (or any two constituents of the molecule, aka material, being electrolyzed). However, for teaching purposes, the remainder of the present description is based on the electrolysis providing oxygen and metal products.

Since electrolysis of molten material is not perfectly efficient, such electrolysis generates thermal losses which, with devices of the prior art, would be an undesirable loss. With the heating head 500 of the present description, the thermal losses resulting from the electrolysis of material 510 helps heating the incoming material 510 when the heated material are further extruded. Accordingly, the process performed with the present heating head 500 is more efficient than devices of the prior art since it combines these two processes rather than doing them separately, and thus yielding significant economies of energy.

The electrochemical reactions about the top electrolysis electrode 580 have various modes of operation depending on the types of voltage differentials used.

When using a voltage differential of direct current, oxygen is produced near one side and metal on the other. It is possible to switch the sides on which they are generated during the process by inverting the polarity. Thus, the heating head 500 provides the flexibility to decide to have oxygen generated in the center and metal generated on periphery, aka near the conduit surface 529 (so the interface between layers of extruded material will be mostly metal to metal) or oxygen (so the interface is mostly raw material to raw material). The generation of new materials from raw material that is less viscous (a gas which flows, a metal that is in a liquid form) at the interface between the raw material and the containing heating head 500 gives direct control of the flow of material 510 in the heating head 500.

Accordingly, by controlling the ratio of surface of molten material areas 556 between the bottom cross-section 554 and the top cross-section 555, one can alter the cross-section speeds of output versus input of molten material 510, or alternatively keep the ratio equal to one (1) and thereby induce no change of speed inside the molten material 510.

When using voltage differential of alternating current between electrode 552 and/or electrode 553 with the electrode 557; i.e., at each half-cycle of the AC cycle, oxygen or metal is produced, and during the next half-cycle, the complementary product is produced. When done slowly, these complementary products might be separated and not react with each other due to the flow of materials 510.

When the process is performed at a high enough frequency, the complementary products react with each other to generate heat. Such reaction may be described as burning. The burning of generated metal and oxygen at the interface between the molten material and the heating head 500 forms an envelope that totally encloses the molten material (excepting the raw material input and output). The material enclosed in the envelope inevitably reaches the temperature of the envelope regardless of the temperature outside of the envelope (following the laws of thermodynamics of a fluid in an envelope preventing exchange with the exterior). While material 510 is being extruded, this might not be perfectly the case depending on input and output temperatures, but it can be compensated by making the electrolysis reaction stronger/weaker near the electrode 552 or the electrode 553 with proper control of voltage differentials.

It is to be noted that some materials will not operate as described hereinbefore, or not much, when electricity conducted is null or at low frequency, but will operate as described at a high enough frequency. Such characteristics may be of importance in the hereinafter described cold crucible mode of operation).

Further, since the temperature outside of this combusting envelope has little impact on the temperature inside of the envelope, it becomes useful for some types of materials that are hard to melt (for example, alumina) to proceed with the cold crucible approach such as used in B. Nacke, V. Kichigin, V. Geza, I. Poznyak. Continuous melting and pouring of an aluminum oxide-based melt with cold crucible. 8th International Conference on Electromagnetic Processing of Materials, October 2015, Cannes, France. EPM2015. <hal-01331350> (https://hal.archives-ouvertes.fr/hal-01331350/document). Active cooling using the flow of colder liquid in channels, e.g., the cooling channels 563 (only partly shown), can similarly allow the melting of materials at much higher temperature than could normally support the electrodes 551, 552, 553, 557 and 560. The same principle used to be able to contain molten alumina described in the mentioned study can be used to leave the center electrode in the center.

Since known cold crucible modes of operation likely end up making some of the raw product solid close to the heating surface heating the material, using voltage differentials of high frequency alternating current with the present heating head 500 to drive the heating head 500 allows to overcome that drawback.

Figure 13:
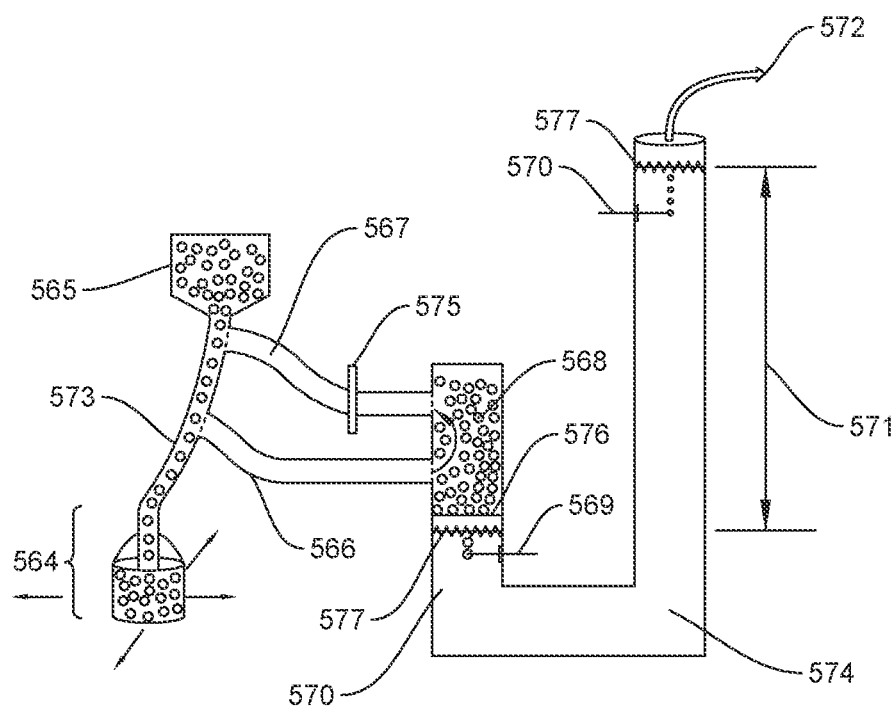
FIG. 13 is a schematic of a system comprising a fused deposition modeling printer adapted to perform electrolysis in accordance with an embodiment.

Referring additionally to FIG. 13, in a particular case of operation with reduced gravity or lack of atmosphere (as to provide pressure differential with environment, for example, on the moon or in space, thus helping giving the molten materials a preferred direction at the output) or to collect generated gases by the top electrolysis electrodes 560, the heating head 500 (except output) and connected raw material closed reservoir 565 can be hermetic to gas exchanges using an appropriate flexible tubing. This closed volume can be in addition connected to an oxygen extractor (not depicted) and/or gas processor (not depicted) via the gas conduits 566 and 567 with appropriate gas/solids separators, e.g., a grid extractor, at the connecting side near the heating head 564 or the raw material reservoir 565 or the raw material flexible tube 573. Not shown on the gas conduit 566, means may be used to actively cool off the traveling material along the path of the gas conduit 566 to allow easier handling. Flow of gas can be induced using an appropriate means (e.g., a fan).

The gases are made/forced to go through a catalyst at the catalyst 568 (platinum plated silica beads, for example) such that oxygen will readily react with the generated hydrogen at the first electrolysis electrode 569 and generate water, which drops into the liquid 574 (e.g., a mix of water and of an appropriate electrolyte, as needed). This recuperated water forms a dynamic equilibrium where hydrogen is generated at the first electrolysis electrode 569, oxygen is generated at the second electrolysis electrode 570 and collected at the extracted gas output 572. The collected oxygen is compensated by the generated oxygen at the top electrolysis electrode 560, thus extracting at the extracted gas output 572 only oxygen from the fumes generated at the top electrolysis electrode 560 while the rest of the gases are not extracted (and could be discharged out in the environment (through any appropriate handling equipment not depicted) or incorporated into the extruded materials exiting the heating head 500 through the nozzle 530 (FIG. 5) using the optional connecting hole at (optional) inner conduit 559. An appropriate separator at the catalyst/gas separator 576 separate the catalyst 568 from the liquid 574. Membranes that allow the passage of gas but not liquids can be used if needed at the liquid/gas separator 577 (for example, in the absence of gravity). A height differential 571 is to be expected and prepared for if the pressure at the catalyst 568 is not the same than at the extracted gas output 572, either by design or necessity. A negative differential of height (aka when the catalyst 568 is higher than the extracted gas output 572 relative to a reference level) could be used to pressurize passively the generated oxygen at the extracted gas output 572, which could be useful.

Since the process at the catalyst 568 produces some unwanted water vapor, more gas processors (not depicted) can be added on the path back (at the other gas processing insert 575 or anywhere appropriate). Regarding water vapor, an available solution consists in making the gases go through a large amount of silica to adsorb/scrub water vapor (which can be later vented out by simply reheating it), then through fins of metals that will steal the oxygen by oxidation (silicon at high enough temperature creates silica via the wet process) and generate hydrogen that will be converted later on at the catalyst 568.

The combination of at least some of these methods provide a way to extrude molten materials at very high temperature, aka extremely high temperature according to known state of the art techniques, when using the cold crucible approach (even if the cold crucible approach is less efficient than the first described approach), enabled by the combusting high-temperature envelope made possible by the alternating current electrolysis near the output of the heating head 500, a way to generate gas (for pushing material or resources generation) via electrolysis at the input, a way to extract oxygen selectively, and a way to passively provide oxygen pressure.

Referring now particularly to FIGS. 14 to 27, other embodiments of a fused deposition modeling printer and of a heating head are provided that are particularly well suited for operation under positive pressure relative to the environmental, atmospheric, pressure such as lunar installations, and particularly using lunar regolith as raw material.

The alternative embodiment of the fused deposition modeling printer comprises a second reservoir of raw material that allows continuous processing of regolith fed alternatively from the reservoirs. Valves are used to allow and prevent the reservoir to feed raw material, so one reservoir can be filled while another one, pressurized, is used to feed the material.

While FIGS. 14-17 shows two reservoirs, since two is the minimum number needed for continuous operation, alternative embodiments may comprise more than two, based for instance on the feeding speed, the capacity of the reservoirs and the time required to pass from a reservoir filling operation to the reservoir feeding the system.

To face the particularly abrasive structure of the regolith, feeding conduits, aka tubes, connecting the reservoirs to the nozzle are vibrated to prevent clogging. Lunar regolith is notorious for having no flowability at all. Vibrators such as used in the concrete pouring construction context are used also over the reservoirs to prevent clogging.

It is worth noting that the reservoir size shown on FIGS. 14-18 is out of scale, it is only illustrated for showing the concept. The expected size in operation is much bigger, adapted to be filled with excavation equipment.

It is further to be noted that the reservoirs comprise a proper lid capable of maintaining pressure therein, wherein such lid can be adapted from known art.

The hot end, featuring heating heads, allows using multiple, e.g., up to 6, electrodes independently. In the depicted version, 4 are used. In the heating heads, e.g., regolith. material is added to a platinum-based funnel. A camera pointing to marks on the central electrode allows measuring the level of molten material. A type-S thermocouple measures the temperature just above the nozzle, inside of a cavity of an e.g., alumina, cap. Since all the exterior of the heating head is actively cooled, one can use regular materials to ensure that it is hermetic, such as silicone seals used as a cheaper alternative to ensuring the material path is perfectly leak-proof in the high-temperature section between 750, 727 and 732'" (see FIG. 26). Also, since these could themselves be porous, silicone can be added on the cold envelope surface, along and around the water-cooled exterior electrodes and any other cold surface necessary to contain the pressure inside the hot path. Above the pressurized cap are cooling coils, serving as heat break for the camera. The platinum-based part at the outlet of the nozzle is designed in such a way that the heat-generating electricity goes through the bottom of the part extruding the molten material, more specifically the small volume of it that will be exposed to the cold outside under the heating head, so the thickness of that small exposed volume can be adjusted to the point where its resistivity adequately compensate for the heat loss by radiation of that exposed surface. A conducting layer connecting the outer water-cooled electrodes to the inner platinum-based nozzle are split in two with a bit of space so they can be pressed by the electrodes onto the central part. Small springs are added to the electrodes to that effect. Small ceramic parts with plastic adapters are put in place to stop heat loss via radiation.

Raw material, particularly raw regolith, can contain ice and other contaminants in addition to the expected material. Other solutions available to process such raw material require the raw material, particularly raw regolith, to be pre-processed before being handled, for particle sizes and to possibly sort different materials. Except to remove rocks bigger than the pathway size (currently >2 mm), the described design minimizes either or avoids entirely such pre-processing. As such, water contained in the raw regolith with be turned to steam that is collected in a condenser (using the outer space coldness to cool down the steam). Other volatiles contaminants present in the regolith will be probably found at the end in the water filter and the gas filter; issues that are outside the scope of the apparatus herein described.

In such conditions, hydrogen is expected to be available via water electrolysis yet not stored due to costs, so hydrogen can be used to pressurize the molten regolith since it helps its extrusion. It is worth noting that use of hydrogen will also change the electrolysis efficiency as oxygen can be extracted from some minerals in the presence of high-temperature hydrogen.

One must conceive from the present disclosure that the gas discharged through the exhaust tube 712 may include metallic vapors, and the condensation of the gas may provide water and solid metallic depositions, filtrable, from the condensed liquid.

In the embodiment depicted through FIGS. 14-27, the heating head is adapted to be produced using multiple parts (manufactured through casting methods and pottery/ceramic methods).

Figure 14:
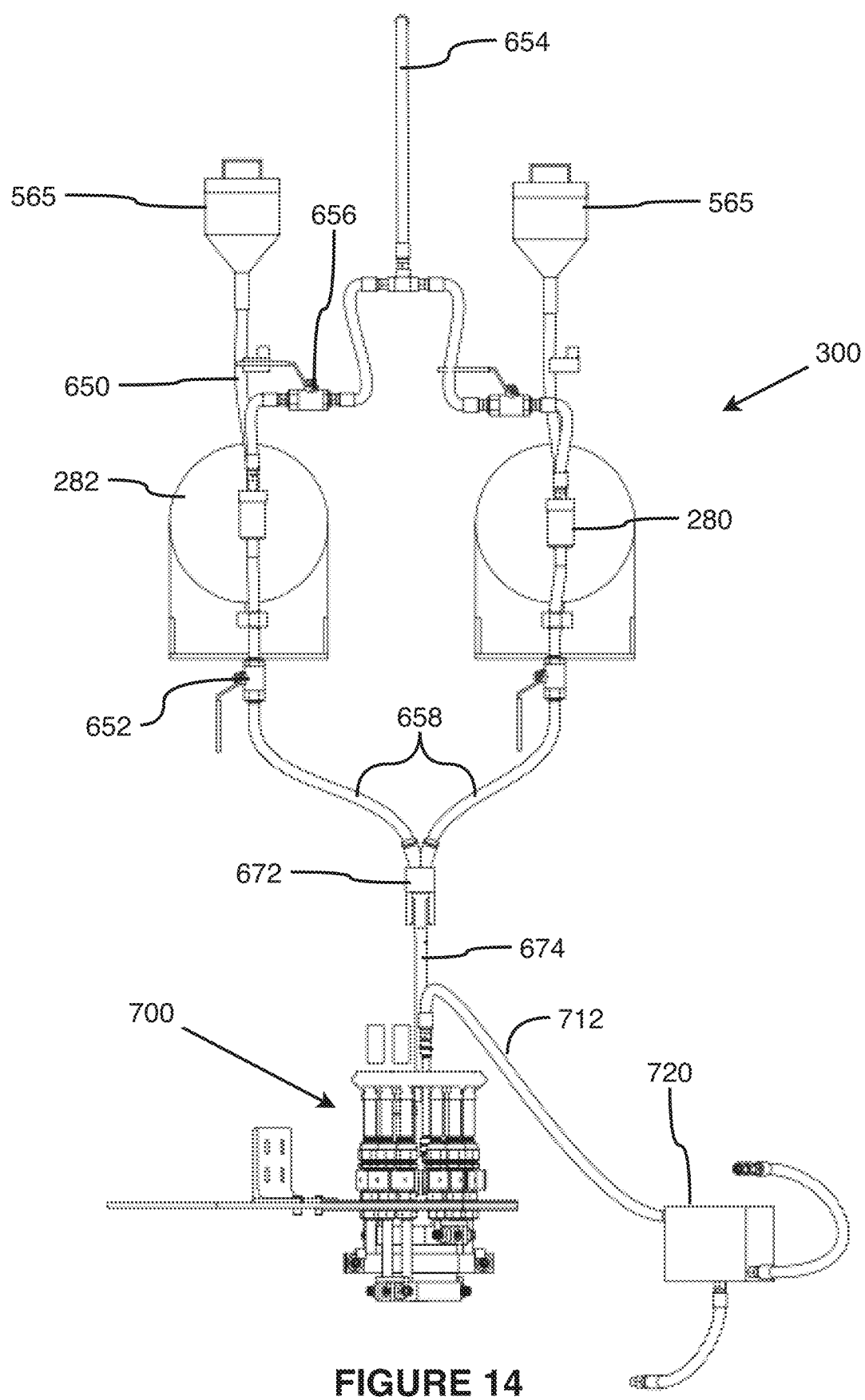
FIG. 14 is a front view of a fused deposition modeling printer accordance with another embodiment.

Referring to FIG. 14, an embodiment of a fused deposition modeling printer 300 comprises two reservoirs 565 connected to a heating head 700, wherein one of the reservoirs 565 is feeding the heating head 700 at the time with raw material, e.g., raw regolith.

Referring additionally to FIGS. 15 to 20, the reservoirs 565 are connected to the heating head 700 through tubes 650, aka with a valve 652, or other flow controlling device, disposed in-downflow of the reservoirs 565 to control whether a reservoir 565 is connected or cut off from the heating head 700, wherein a cut off reservoir may be filled without affecting the pressurized condition of the whole system (a few psi over the atmospheric pressure when operating in pressurized condition).

According to an embodiment, a pressurized gas feeding tube 654 fed with pressurized gas is connected to flow-controlling parts 280 with valves 656, or other flow controlling device, allowing to individually cut off pressure over the raw material feeding conduits.

Figure 15:
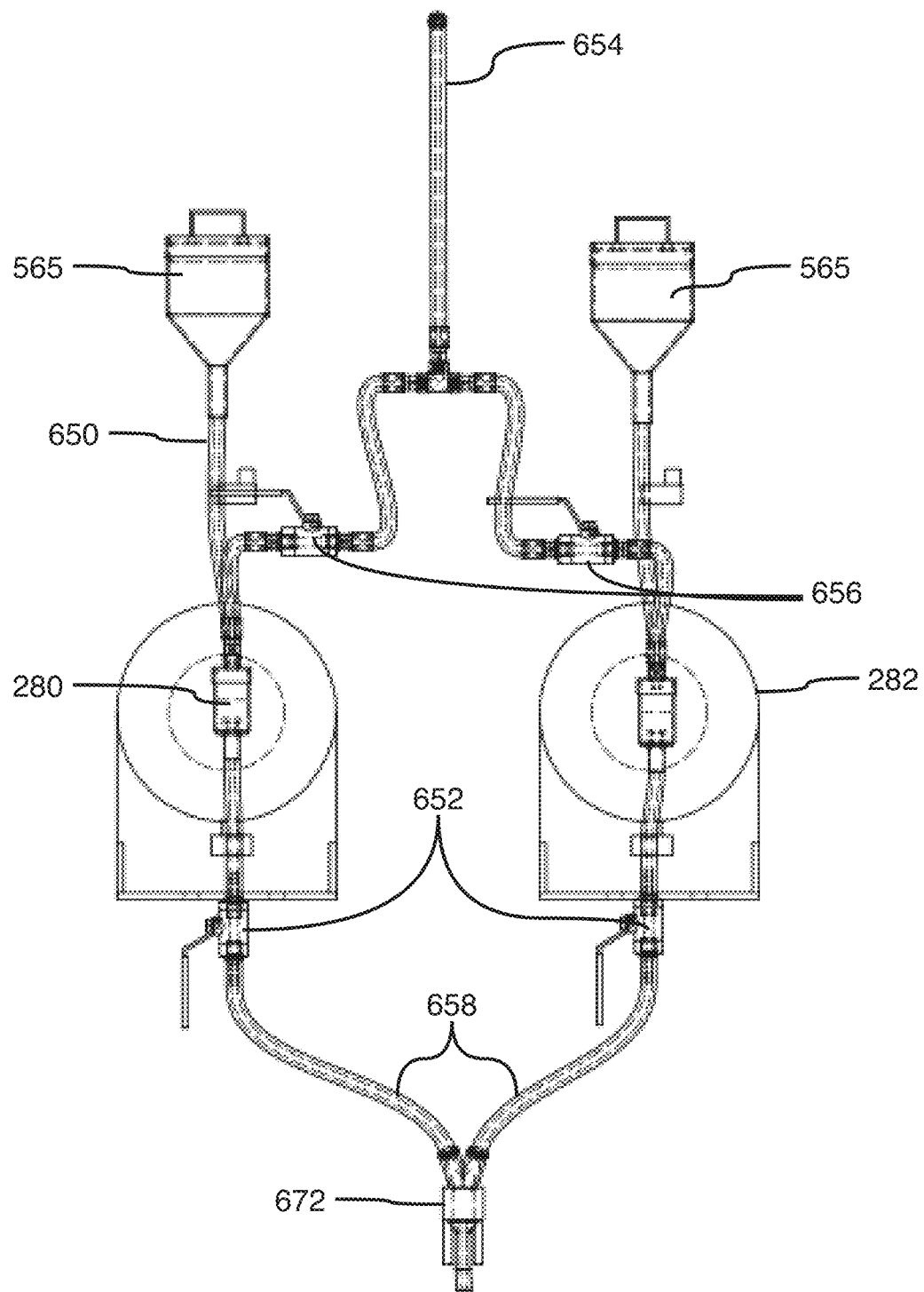
FIG. 15 is a front view of the material distribution portion of the fused deposition modeling printer of FIG. 14.
Figure 16:
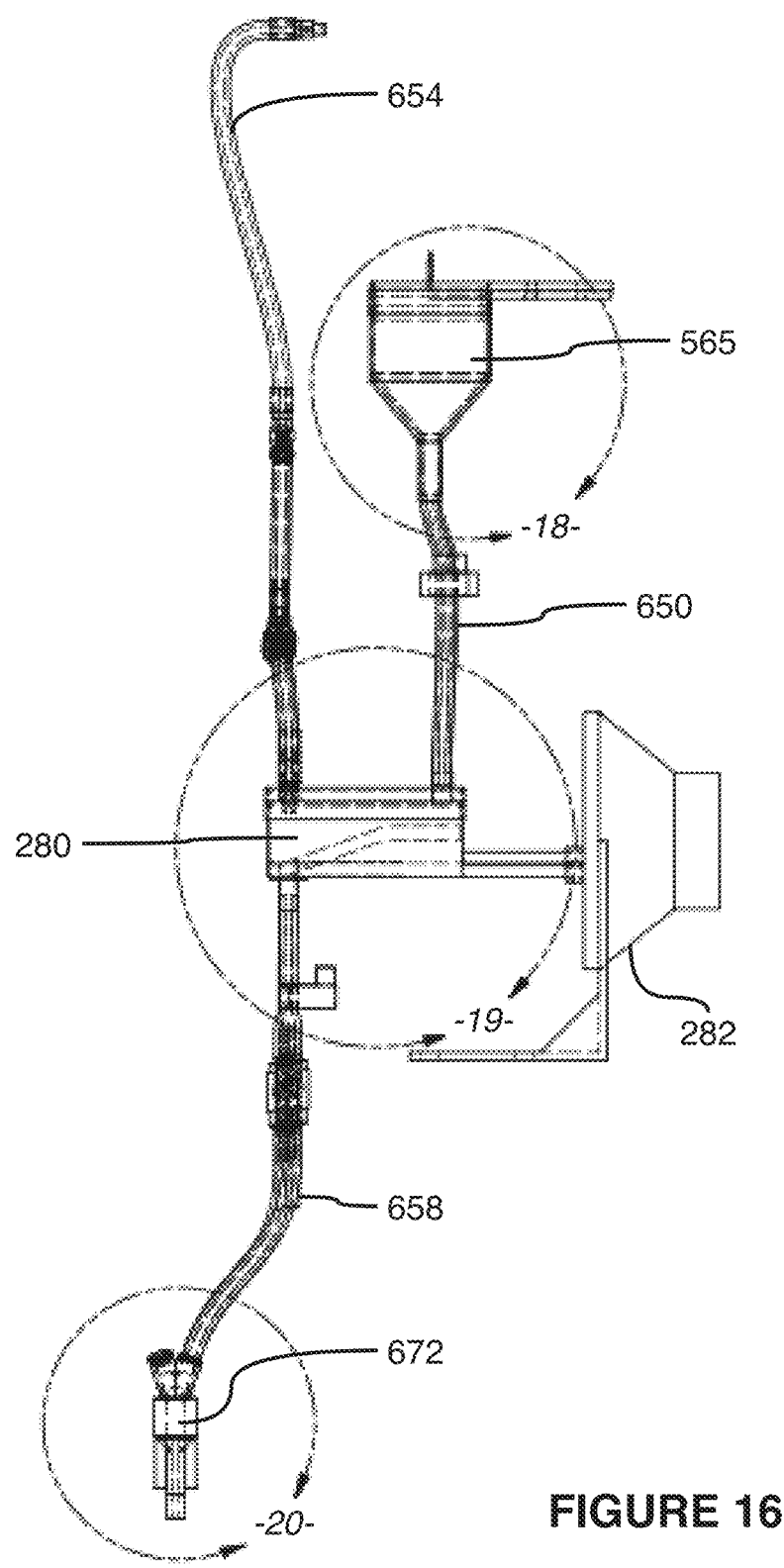
FIG. 16 is side view of the material distribution portion of FIG. 15 with a reservoir and downstream components normally connected thereto down to the y-connection, not depicted in the figure.
Figure 17:
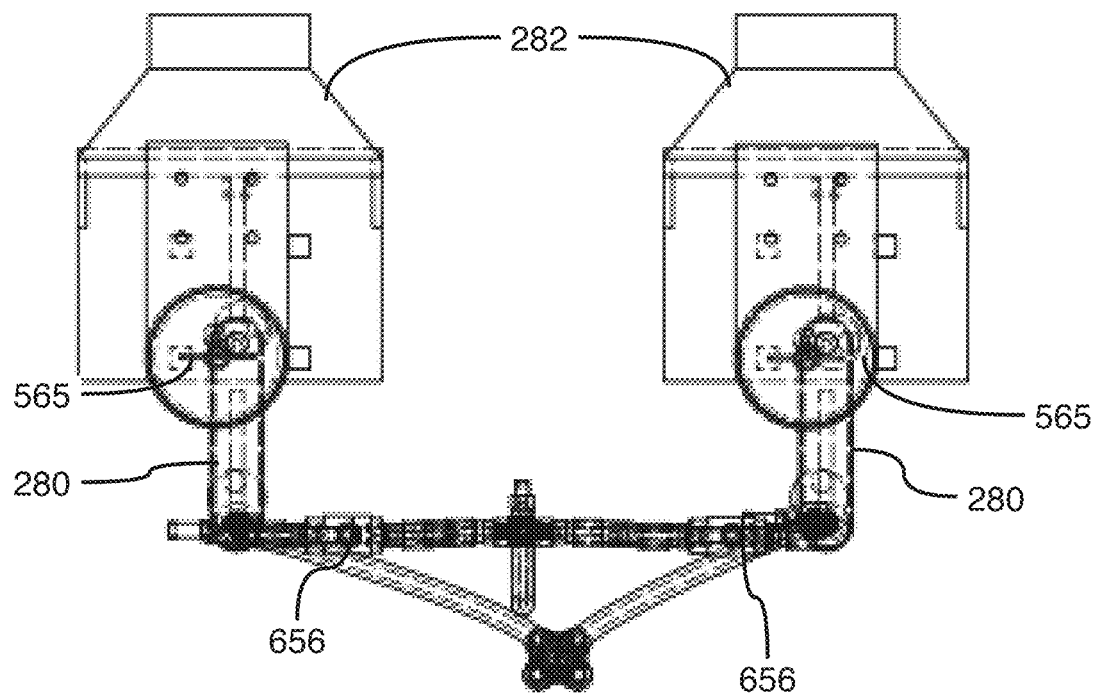
FIG. 17 is a top view of the material distribution portion of FIG. 15.
Figure 18:
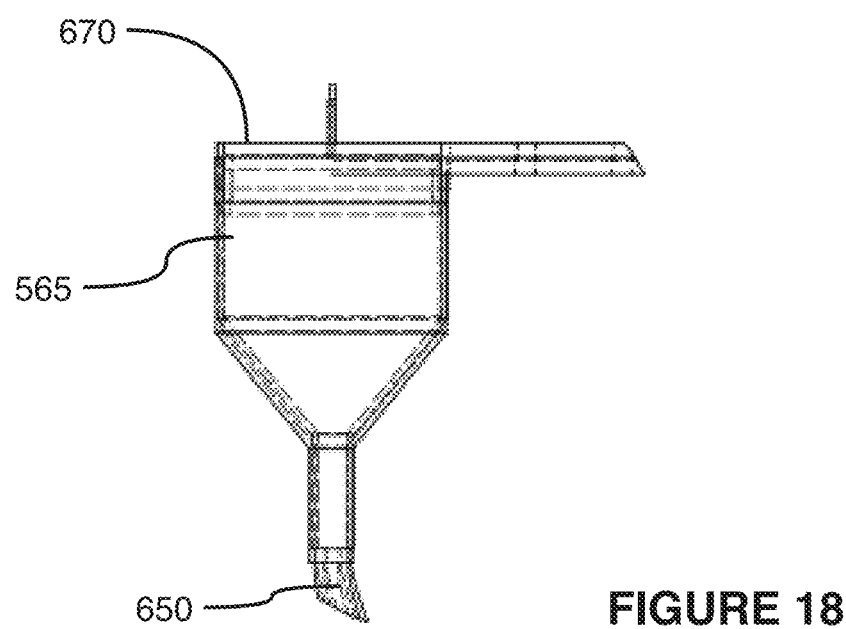
FIG. 18 is a side view of a reservoir of the material distribution portion of FIG. 16 according to detail line -18-.
Figure 19:
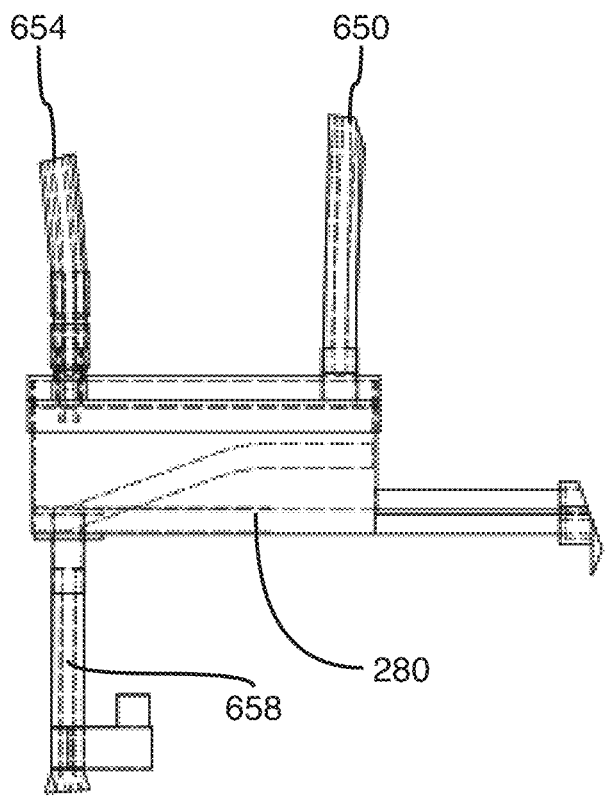
FIG. 19 is a side view of a flow-controlling part of the material distribution portion of FIG. 16 with a section of the connected tubes depicted according to detail line -19-.
Figure 20:
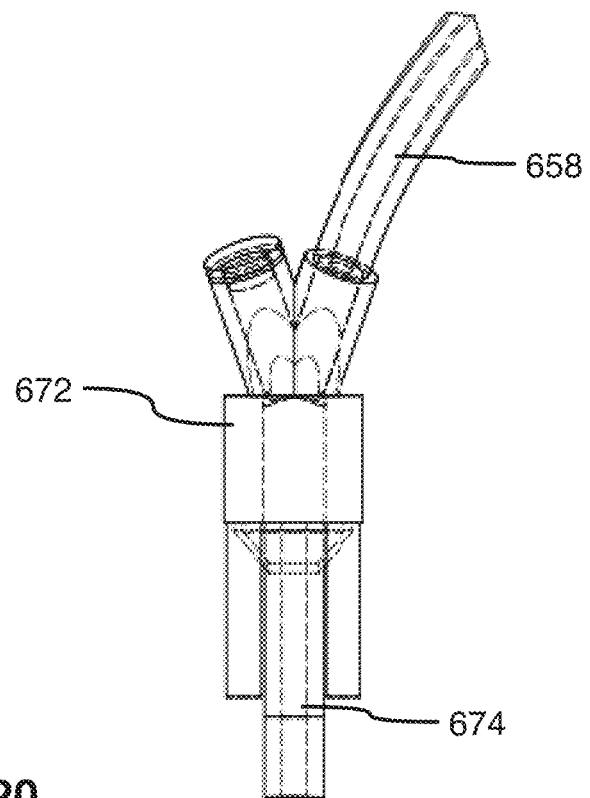
FIG. 20 is a side view of the y-connection of the material distribution portion of FIG. 16 with a section of connected tubes depicted according to detail line -20-.
Figure 28:
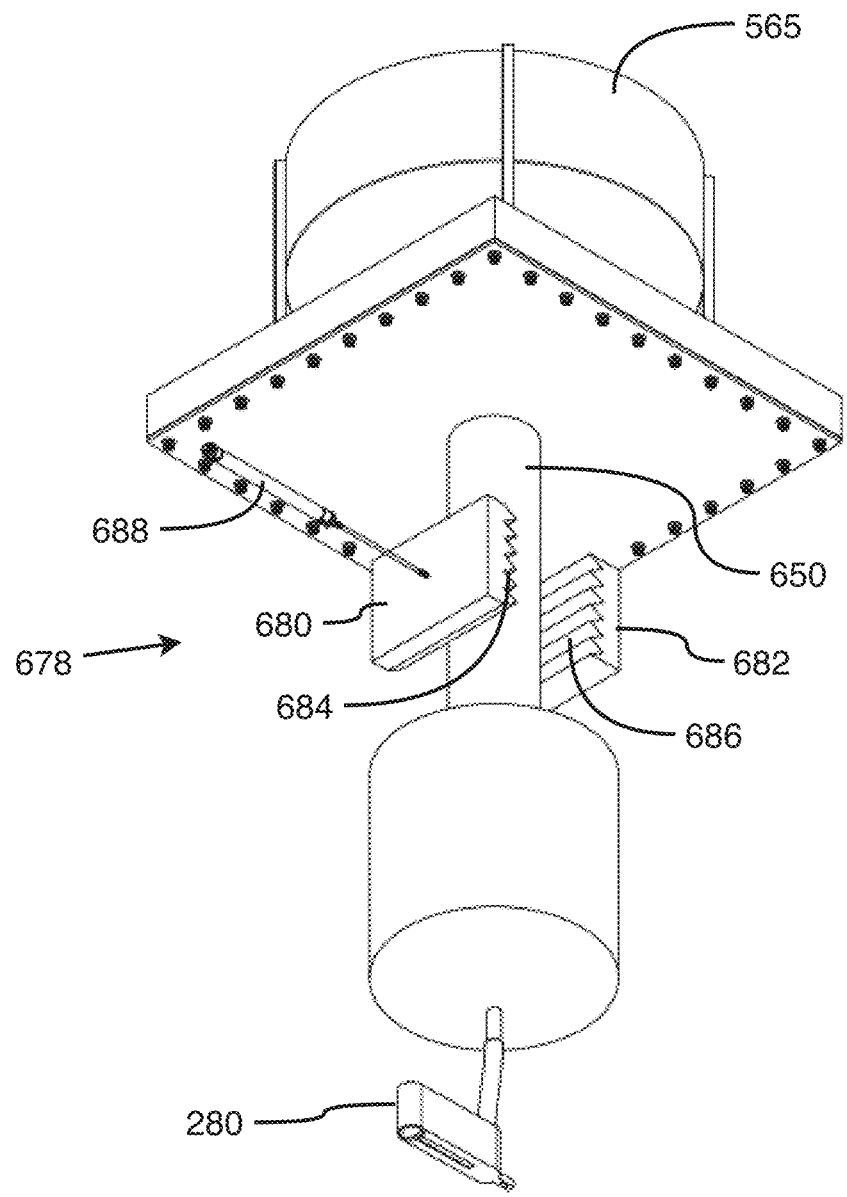
FIG. 28 is a perspective view of an embodiment of a tube closing device in accordance with an embodiment of the material distribution portion of FIG. 15.

Referring now to FIG. 28. according to embodiments closing off the pressurized gas feeding tube 654 or the tube 658 may be performed by manually controlled means such a manual valve 652, 656 as depicted on, e.g., FIG. 15. Alternatively, as depicted on FIG. 28, closing off a tubing may be performed through mechanically controlled closing means such a jaw assembly 678 comprising a pair of jaws 680, 682 having abutting faces 684, 686 pressable against a compressible tube, e.g., tube 650, to close up the conduit between them. A system of hydraulic or pneumatic cylinder 688 may be used to push the jaws 680, 682 toward each other until the tube in-between provides no more inner conduit. When the conduit needs to be open, pressure is released over the jaws 680, 682 and a spring (not depicted) or other biasing means may be used to push back the jaws 680, 682 to their default distant position. According to an embodiment, the faces 684, 686 are made of slightly deformable material that can both efficiently compress the tube in-between and be deformed to provide efficient interaction between the faces 684, 686 and tube.

It is worth noting that FIG. 28 depicts the principle of jaw assembly 678, wherein the components and the shapes, particularly the shape of the are not indicative of the preferred embodiment but rather depicted for teaching purpose.

Referring back particularly to FIGS. 15 to 20, the reservoirs 565 comprise a removable lid 670 removed from the reservoir 565 during raw material filling operation and sealed over the reservoir 565 when the tube 650 connected to the reservoir 565, and accordingly the reservoir 565, is pressurized during feeding operation.

The flow-controlling parts 280 comprise two inlets, one connected to the raw material feeding tube 650 and the other connected to the pressurized gas feeding tube 654. The flow-controlling parts 280 each comprises an outlet to which is connected a tube 658 leading to a Y-connection 672 whereby the connections of the reservoirs 565 are merged into head feeding tube 674 connected at the other end to the heating head 700.

Figure 21:
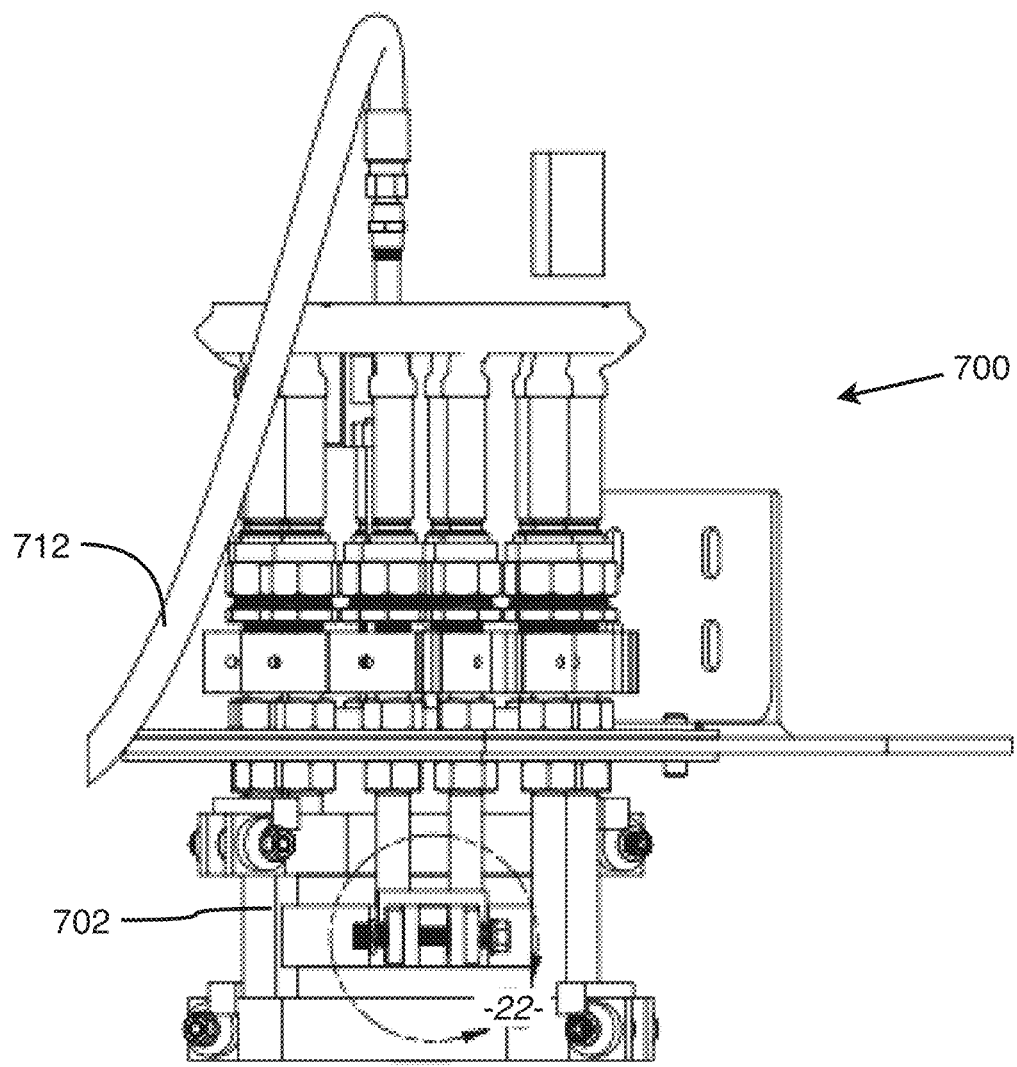
FIG. 21 is a side view of a heating head with its casing of the fused deposition modeling printer of FIG. 14.
Figure 22:
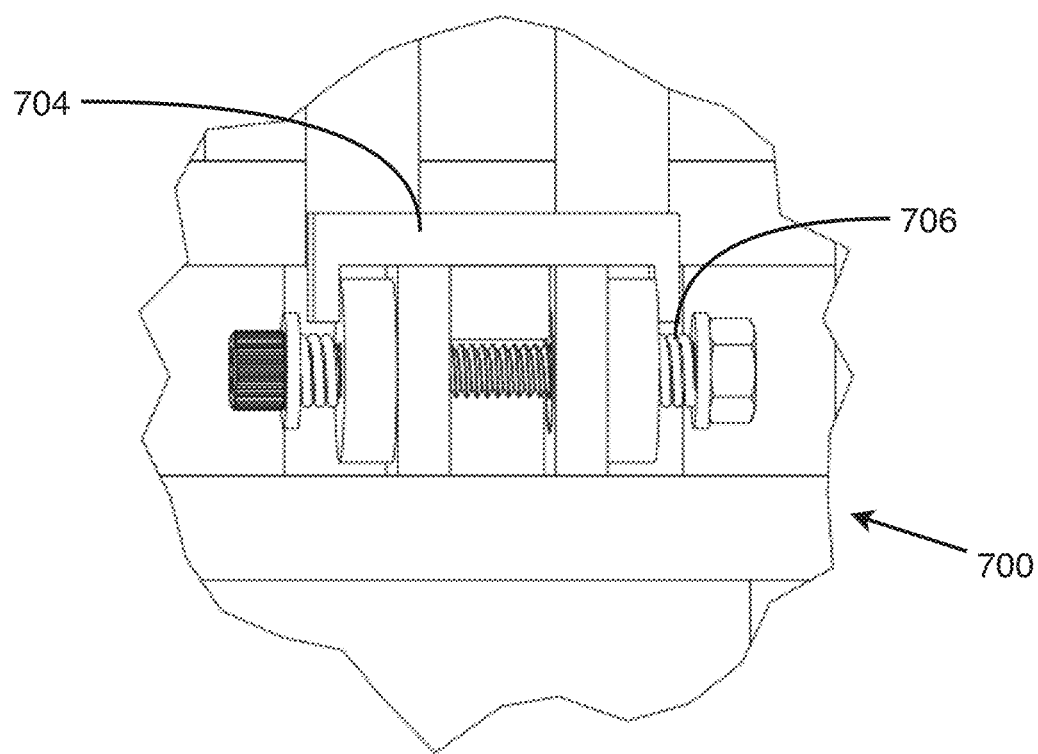
FIG. 22 is close-up view of a portion of the casing of FIG. 21 according to detail line -22-.
Figure 23:
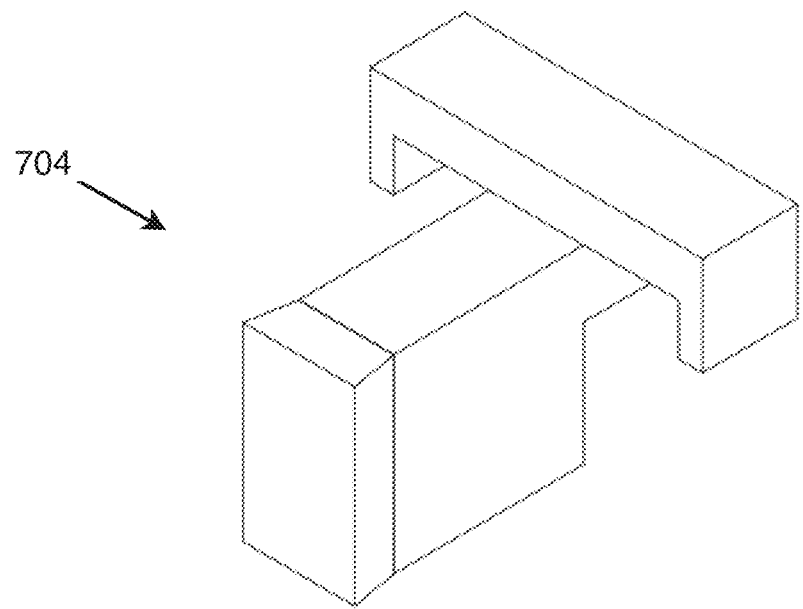
FIG. 23 is a perspective view of a hook piece of the casing of FIG. 21.

The flow-controlling parts 280 are mounted to vibrations devices 282, e.g., speakers, providing movement to the flow-controlling parts 280 and the connected tubes 650, 658. Combined with the pressurized gas, the vibration eases the flow of raw material and prevent occurrences of clogs in the reservoirs 565 and in the tubes 650 and 658. Referring now to FIGS. 21-23, the tube 674 is connected to the inlet of the heating head 700 where the raw material is heated into a molten phase and used for building 3D objects. The heating head 700 comprises a casing 702 comprising a series of hook pieces 704 mounted with compressing springs 706, wherein the compressing springs are adapted to allow thermal expansion of the heating head 700 and the heating head 700 reverting to its original size as its heats up and cool down.

Referring now to FIGS. 24-27, the heating head 700 is fed with raw material through the head feeding tube 674 and has an exhaust tube 712 connected thereto on its top. The exhaust tube 712 is connected at the other end to a water condenser 720, itself connected to a water output tube 722 and a gas output tube 724. The exhaust tube 712 is adapted to lead gas produced when the heating head 700, through heating and electrolysis of the raw material, and to the water condenser 720. The water condenser 720 is adapted to process the gas, extract water from it, that is discharged through the water output tube 722 while the remaining gas are discharged through the gas output tube 724. In lunar conditions, spatial coldness put in used for this process.

Referring particularly to 26 and 27, the heating head 700 comprises a series of tubular shaped ceramic pieces stacked alternatively between electrically conductive ceramic 732 connecting to an, e.g., water-cooled, electrode (not depicted) and electrically insulating ceramic pieces 735. The ceramic pieces 732, 735 provide a central conduit 738 wherein the raw material is heated and undergoes electrolysis. The bottom pieces 732' (since made of two pieces of less than 180 degrees, see depiction on FIG. 27) houses a high resistance ceramic piece 734 inserted therein and an electrically insulating tubular ceramic piece 736 concentrically inserted. Above is a pair of platinum-based funnel pieces 740, 742 concentrically mounted thereto on top of each other and operating as electrodes. The top piece 732' houses an electrically conductive high-resistance ceramic piece 746 and an electrically insulating ceramic piece 727.

The heating head 700 comprises, on its upper portion, an alumina cap 750 closing the conduit 738.

The heating head 700 features marks 752 on the platinum-based electrode 754 inserted in the conduit 738. An alumina tubing 760 provides the necessary outlet to discharge gas. A cooling coil 756 operating as a heat breaker is mounted to the tube 760.

Aside, connected to the inside conduit 738 is a type-S thermocouple 762 providing data used to control the heating, extrusion and/or electrolysis processes.

Figure 24:
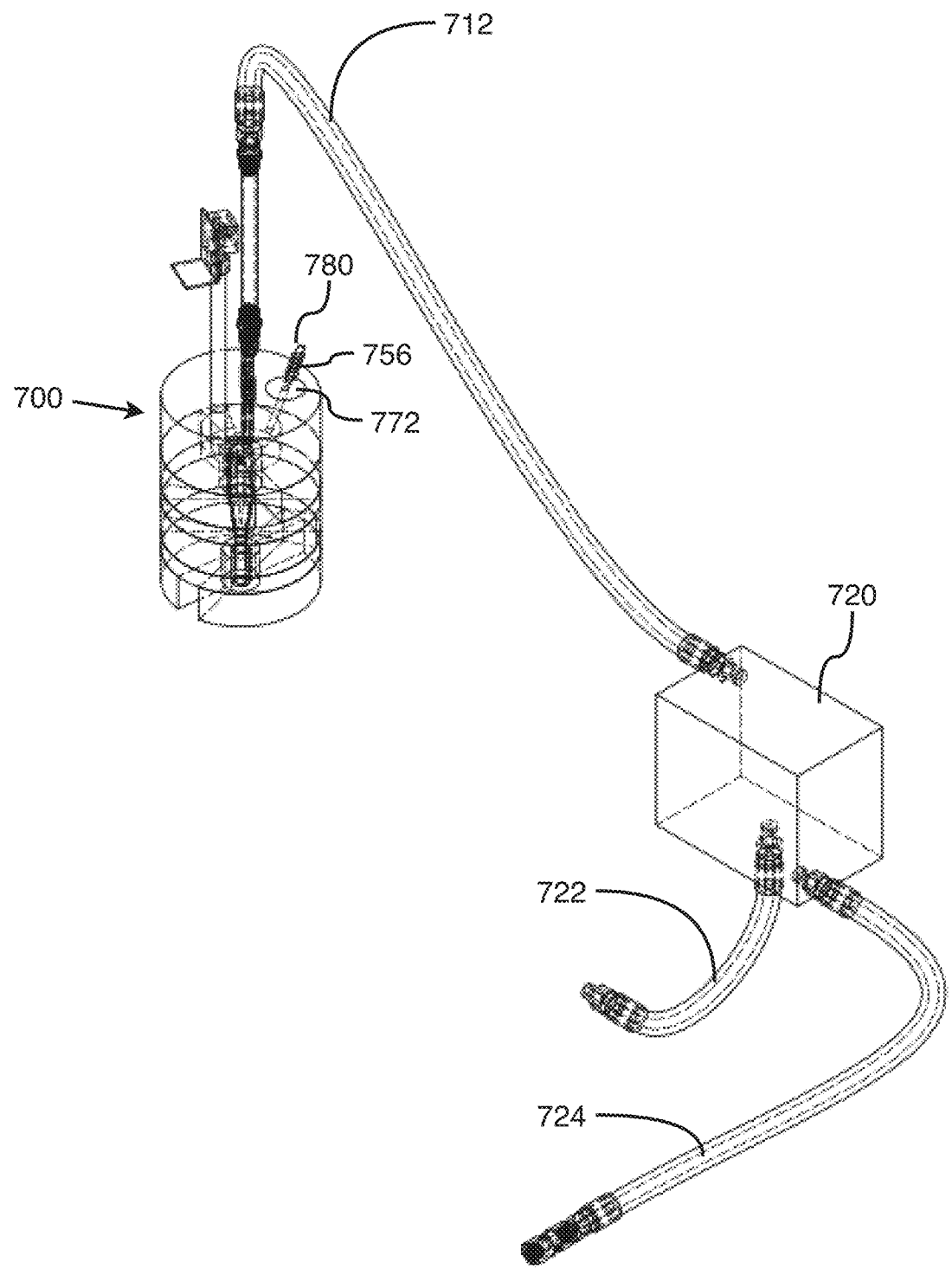
FIG. 24 is a perspective view of the heating head (with the casing not depicted in the figure) connected to a water condenser.
Figure 25:
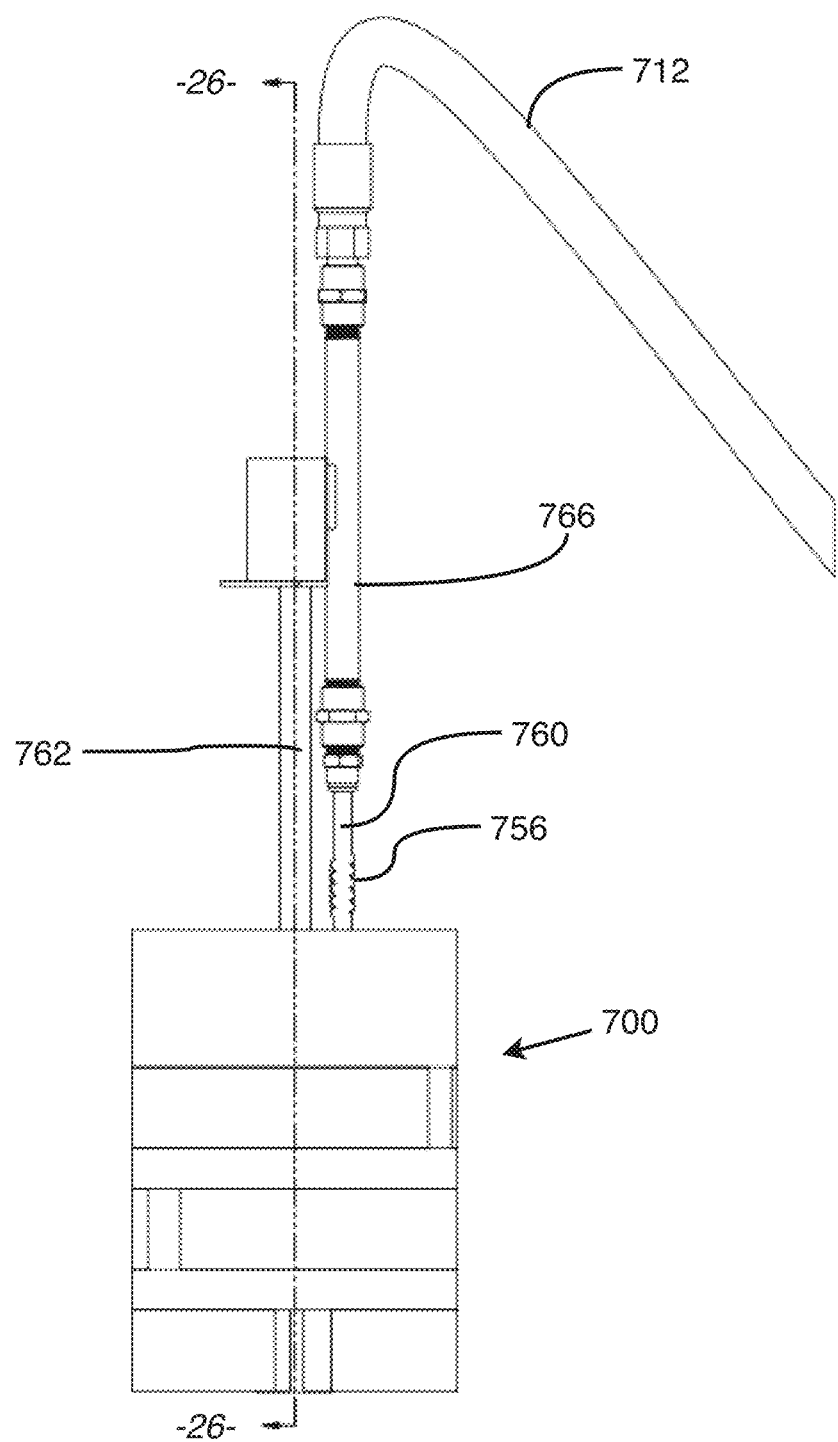
FIG. 25 is a front view of the heating head of FIG. 24 with a portion of an exhaust tube connected thereto.
Figure 26:
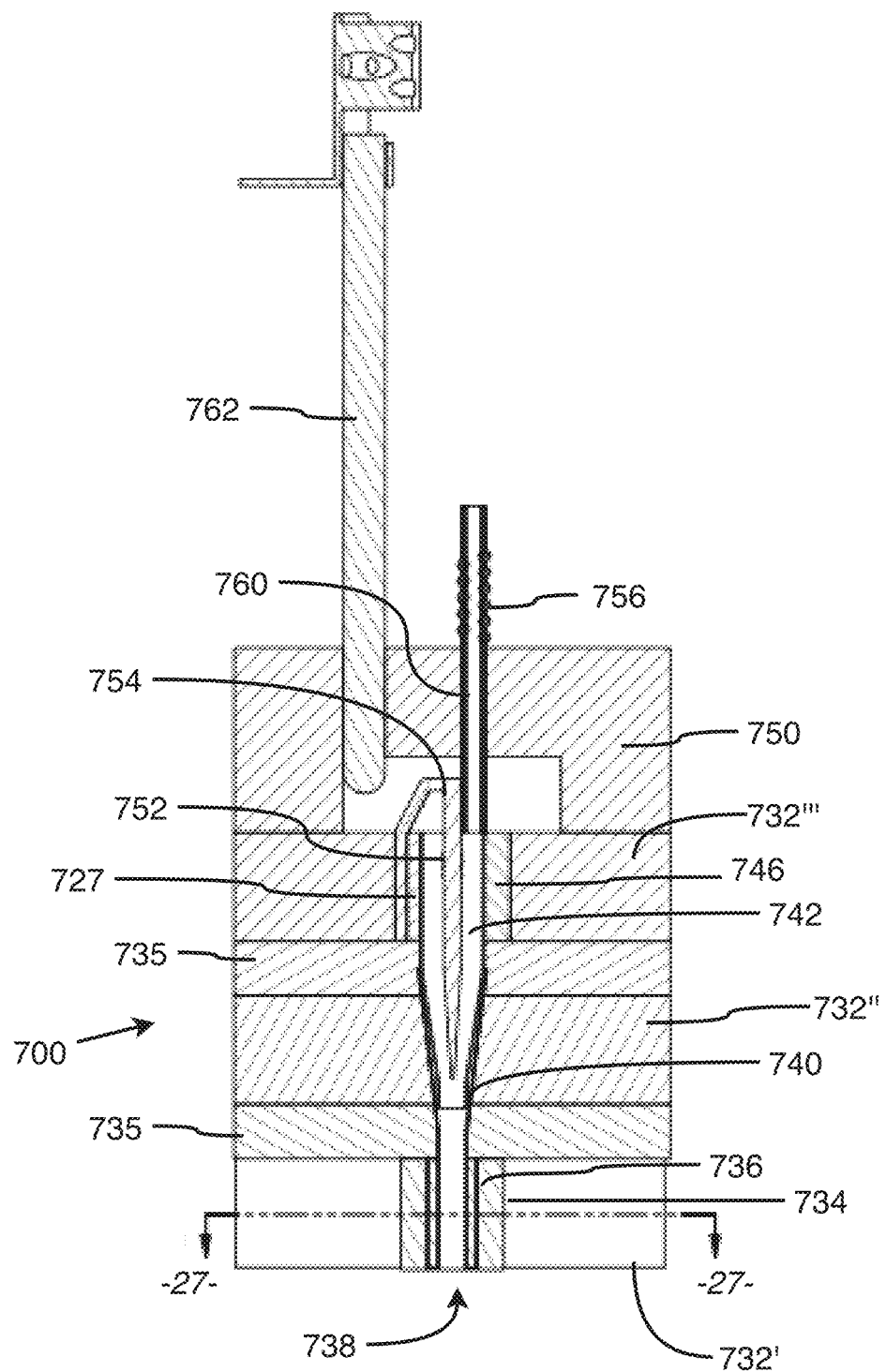
FIG. 26 is a cross-section view of the heating head of FIG. 25 according to detail line -26-.
Figure 27:
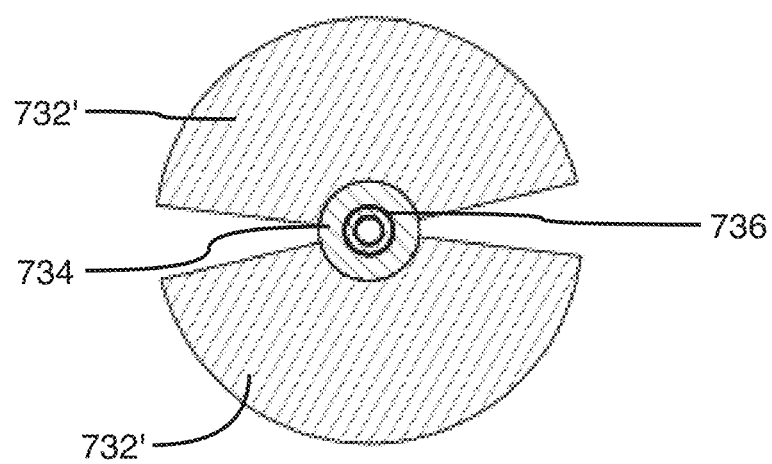
FIG. 27 is a cross-section view of the heating head of FIG. 25 according to detail line -27-.

Referring particularly to FIGS. 24-25, a camera 780 is mounted on top of the heating head 700, point to the marks 752 through the transparent material 772 part of the cap 750.

Since the exhaust gas is of very high temperature, the exhaust tube 712 is connected to the heating head 700 through one or more intermediary tube optionally featuring heat break components. FIG. 25 depicts the exhaust tube 712 connected to a second, e.g., metal, tubing 766 itself connected to a first e.g., alumina, tubing 760. The tubing 760 is mounted to the heating head 700. In this realization, the tubing 760 features a heat break through the cooling coil 756.

It is worth noting that molten oxide electrolysis efficiency goes down as oxygen is extracted from the molten material. By having a continuous flow-based oxygen extraction method, the process can be tuned to always stay in the sweet spot of high efficiency. The ejected molten material, e.g., regolith, can be used to 3D print habitats or parts instead of being discarded. The injection of hydrogen (otherwise discarded due to cost of storage) further can help tune efficiency, providing mechanical pressure to the molten material. It can also tune whether oxygen is collected as oxygen or as water, in a variable proportion. Molten oxide electrolysis is not 100% efficient, but that inefficiency generates heat, which is needed anyway, so the global efficiency calculation of this combined process is much different than doing 3D printing and oxygen extraction processes separately.

Therefore, one may understand from the present method and associated system allowing to perform simultaneously electrolysis with oxygen extraction and heating of material for printing that it provides a better global efficiency that the processes performed independently.

Figure 29:
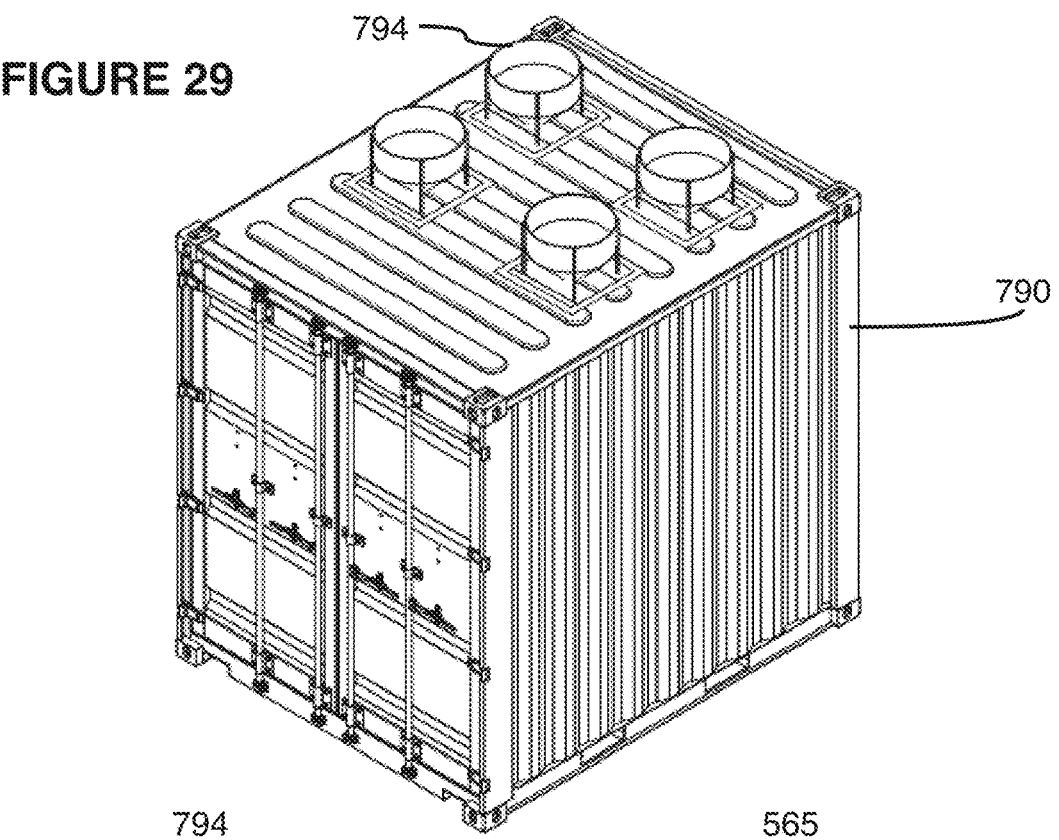
FIGS. 29 to 31 are respectively a perspective view, a front view and a cross-section view of a container adapted to enclose an embodiment of a fuse deposition modeling printer, wherein only an upstream portion of the material feeding components are depicted.
Figure 30:
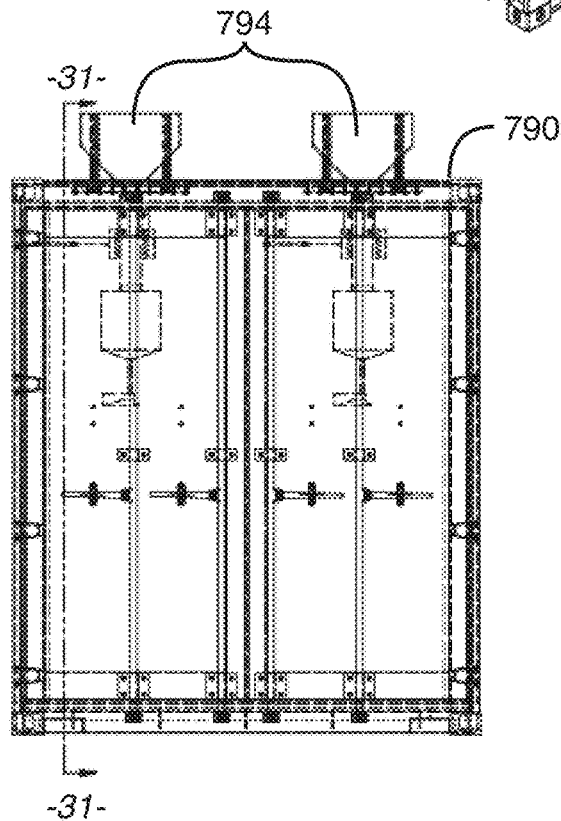
Figure 31:
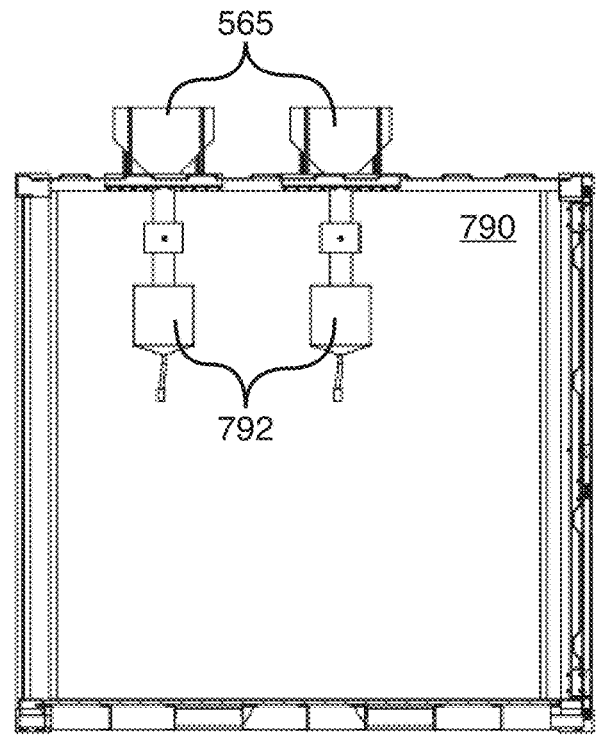

Referring now to FIGS. 29 to 31, the system may be enclosed in a protective casing such as a container 790, with only a top filling component, e.g., funnels 794, leading to reservoirs, e.g., pressurized reservoirs 792. Having only the funnels 794 extending through the top of the container 790 provides protection to the system from material falling off the funnels 794 or being dropped beside the funnels 794 when filling the pressurized reservoirs 792.

It is worth noting that during operation of a reservoir, the funnel connected thereto is designed to stay empty. However, with the use of the jaw assembly 678, the system may be subject to the presence some material in the funnel 794 without resulting in a faulty operation.

The container 790 may comprise tanks or outlets (not depicted), for example tanks to which may be connected the water output tube 722 and the gas output tube 724.

Still referring to FIGS. 29-31, a 4-reservoir embodiment provides a cyclic solution to operate a fused deposition modeling printer 100, 300 with minimal down time. During a first cycle, a first reservoir is in a filling process phase; a second reservoir is in a depressurization phase; a third reservoir is feeding the heating head with material, and the fourth reservoir is in a pressurization phase. When these processes are completed with each of the reservoirs, the status and operation of each of the reservoirs change, for instance the first reservoir being pressurize. Thus, through a full cycle, all reservoirs pass through the 4 operation conditions in order, allowing as stated to minimize downtime.

Referring to e.g., FIG. 15, a 2-reservoir embodiment provides a cyclic solution wherein the reservoirs are following the same cycle, with the reservoirs being at the same time in the longer (active) phases (filling and feed), and at the same time in the shorter phases (pressurization and depressurization). The shorter phases are also called passive phases since the heating head is not used during these phases.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A heating head assembly for a fused deposition modeling printer comprising:
   a heating head comprising:
   a conduit comprising a conduit surface for guiding a flow of material therein;
   an electrically conductive layer providing an electric resistance along the conduit surface;
   a plurality of head electrodes electrically connected to the electrically conductive surface of the conduit surface; and
   an electrolysis component located in the conduit distant from the conduit surface, comprising an electrolysis electrode;
   wherein the heating head assembly is adapted for a first voltage differential applied over the head electrodes to drives an electric current to flow through the electrically conductive layer and heat the conduit surface, and wherein the heating head assembly is adapted for a second voltage differential applied over at least one of the head electrodes and the electrolysis electrode to drive an electric current to travel through the material and produce electrolysis in the material.

2. The heating head assembly of claim 1, wherein the head electrodes comprise at least three head electrodes.

3. The heating head assembly of claim 1, wherein the electrolysis electrodes comprise at least two electrolysis electrodes.

4. The heating head assembly of claim 1, wherein the electrolysis component comprises:
   a first electrolysis component having a first electrolysis electrode associated therewith that penetrates in the conduit at a first depth; and
   a second electrolysis component having a second electrolysis electrode associated therewith that penetrates in the conduit at a second depth different from the first depth.

5. The heating head of claim 4, wherein the conduit has an axis, the first electrolysis electrode is mounted coaxial to the axis of the conduit and the second electrolysis electrode is mounted eccentric to the axis of the conduit.

6. The heating head assembly of claim 1, wherein the first voltage differential is higher/lower than the second voltage differential.

7. The heating head assembly of claim 1, wherein the second voltage differential is of alternative current.

8. The heating head assembly of claim 1, wherein the heating head is monobloc.

9. The heating head assembly of claim 1, wherein the heating head comprises a stack of electrically conductive pieces and of electrically insulating pieces, stacked alternatively.

10. The heating head assembly of claim 9, wherein at least one of the electrically conductive pieces and the electrically insulating pieces is made of ceramic.

11. The heating head assembly of claim 1, wherein the heating head defined an enclosure in which material is heated into molten material, comprising:
    a material inlet for receiving material;
    a nozzle through which exits the molten material from the heating head; and
    an exhaust outlet for discharging gas.

12. The heating head assembly of claim 11, further comprising an exhaust tubing connected to the exhaust outlet, the exhaust tube comprises a heat break distant from the enclosure.

13. A fused deposition modeling printer comprising:
    a reservoir for raw material;
    heating head assembly defining a sealed enclosure, comprising:
      a conduit comprising a conduit surface for guiding a flow of material therein;
      an electrically conductive layer providing an electric resistance along the conduit surface for heating the material onto molten material;
      an electrolysis component located in the conduit distant from the conduit surface, comprising an electrolysis electrode;
      a nozzle through which exits the molten material from the heating head;
      an exhaust outlet for discharging gas resulting from the electrolysis of the heating head; and
    a feeding conduit connecting the reservoir to the heating head.

14. The fused deposition modeling printer of claim 13, further comprising a pressurized gas inlet connected to the feeding conduit.

15. The fused deposition modeling printer of claim 13, further comprising a vibrating device connected to the feeding conduit.

16. The fused deposition modeling printer of claim 13, further comprising an electric power source providing:
    a first voltage differential to two electric contacts of the electric conductive layer; and
    a second voltage differential to the electrolysis component relative to the electric conductive layer.

17. The fused deposition modeling printer of claim 13, further comprising a type-S thermocouple penetrating at least partially in the enclosure.

18. The fused deposition modeling printer of claim 13, wherein the heating head comprises a stack of electrically conductive pieces and of electrically insulating pieces, stacked alternatively.

19. The fused deposition modeling printer of claim 13, wherein the heating head comprises a platinum-based funnel piece through which passes the conduit.

20. The fused deposition modeling printer of claim 13, wherein the heating head comprises a cap sealing the enclosure, the cap having a transparent portion, and wherein the fused deposition modeling printer further comprises a camera pointing at the enclosure through the transparent portion.

* * * * *